US011727142B2

(12) United States Patent
James Stephen et al.

(10) Patent No.: US 11,727,142 B2
(45) Date of Patent: Aug. 15, 2023

(54) IDENTIFYING SENSITIVE DATA RISKS IN CLOUD-BASED ENTERPRISE DEPLOYMENTS BASED ON GRAPH ANALYTICS

(71) Applicant: International Business Machines Corporation, Armonk, NY (US)

(72) Inventors: Julian James Stephen, White Plains, NY (US); Ted Augustus Habeck, Hopewell Junction, NY (US); Arjun Natarajan, Old Tappan, NJ (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 17/225,745

(22) Filed: Apr. 8, 2021

(65) Prior Publication Data

US 2022/0335151 A1  Oct. 20, 2022

(51) Int. Cl.
*G06F 21/62* (2013.01)
*H04L 67/02* (2022.01)
*H04L 41/0604* (2022.01)
*H04L 41/22* (2022.01)

(52) U.S. Cl.
CPC ...... *G06F 21/6245* (2013.01); *G06F 21/6227* (2013.01); *H04L 41/0627* (2013.01); *H04L 41/22* (2013.01); *H04L 67/02* (2013.01)

(58) Field of Classification Search
None
See application file for complete search history.

(56) References Cited

U.S. PATENT DOCUMENTS

| 10,515,212 | B1* | 12/2019 | McClintock | G06F 21/57 |
| 10,530,796 | B2 | 1/2020 | Patterson et al. | |
| 10,873,592 | B1* | 12/2020 | Singh | G06F 9/45558 |
| 2015/0026465 | A1 | 1/2015 | Cucinotta et al. | |

(Continued)

FOREIGN PATENT DOCUMENTS

CN   111832017 A  * 10/2020

OTHER PUBLICATIONS

Zhao Yongli, Zhang Yungui, Tong Weiming and Chen Hongzhi, "An improved feature selection algorithm based on MAHALANOBIS distance for Network Intrusion Detection," Proceedings of 2013 International Conference on Sensor Network Security Technology and Privacy Communication System, 2013, pp. 69-73, doi: (Year: 2013).*

(Continued)

*Primary Examiner* — Kristine L Kincaid
*Assistant Examiner* — Felicia Farrow
(74) *Attorney, Agent, or Firm* — Stephen J. Walder, Jr.; Jeffrey S. LaBaw

(57) ABSTRACT

An improved computing tool performs an improved computing tool function to identify sensitive data risks in cloud-based deployments. A knowledge graph is built based on data schema information for a cloud-based computing environment, a set of parsed infrastructure logs, and a set of captured application queries. A set of sensitive flows in the knowledge graph are identified representing paths from a sensitive data element to an endpoint in the knowledge graph. The set of sensitive flows are scored based on a scoring algorithm and an alert is issued to an administrator in response to a score of a sensitive flow within the set of sensitive flows exceeding a threshold.

23 Claims, 11 Drawing Sheets

(56) References Cited

U.S. PATENT DOCUMENTS

| | | | |
|---|---|---|---|
| 2019/0171846 A1 | 6/2019 | Conikee et al. | |
| 2019/0342307 A1* | 11/2019 | Gamble | G06F 16/9024 |
| 2020/0228558 A1* | 7/2020 | Apostolopoulos | H04L 63/1425 |
| 2020/0244673 A1* | 7/2020 | Stockdale | H04L 63/1416 |
| 2021/0203684 A1* | 7/2021 | Maor | G06F 16/2379 |

OTHER PUBLICATIONS

Arzt, Steven et al., "FlowDroid: Precise Context, Flow, Field, Object-sensitive and Lifecycle-aware Taint Analysis for Android Apps", PLDI '14: Proceedings of the 35th ACM SIGPLAN Conference on Programming Language Design and Implementation, Jun. 2014, 11 pages.

Backes, Michael et al., "Automatic Discovery and Quantification of Information Leaks", IEEE Symposium on Security and Privacy (S&P 2009), May 2009, 13 pages.

Chen, Xu, "Automating Network Application Dependency Discovery: Experiences, Limitations, and New Solutions", Proceedings of the 8th USENIX Symposium on Operating Systems Design and Implementation (OSDI '08), Dec. 2008, 14 pages.

Enck, William et al., "TaintDroid: an Information-Flow Tracking System for Realtime Privacy Monitoring on Smartphones", ACM Trans. Comput. Syst. 32, 2, Article 5 (Jun. 2014), 29 pages.

Lawyer, Glenn, "Understanding the influence of ail nodes in a network", Scientific Reports, vol. 5, No. 1, Mar. 2015, 9 pages.

Maesschalck, R. DE et al., "The Mahalanobis distance", Chemometrics and Intelligent Laboratory Systems vol. 50, Issue 1, Jan. 2000 18 pages.

Myers, Andrew C. et al., "A Decentralized Model for Information Flow Control", Proceedings of the 16th ACM Symposium on Operating Systems Principles, Saint-Malo, France, Oct. 1997, 18 pages.

Nanda, Susanta et al., "Dynamic Multi-Process Information Flow Tracking for Web Application Security", MC '07: Proceedings of the 2007 ACM/IFIP/USENIX international conference on Middleware companion, Nov. 2007, 20 pages.

O'Conner, T.J. et al., "PivotWall: SDN-Based Information Flow Control", SOSR '18, Proceedings of the Symposium on SDN Research Mar. 28-29, 2018, Los Angeles, CA, USA, 14 pages.

Page, Lawrence et al., "The PageRank Citation Ranking: Bringing Order to the Web", Stanford Digital Library Technologies Project, Jan. 29, 1998, 17 pages.

Popa, Lucian et al., "Macroscope: end-point approach to networked application dependency discovery", CoNEXT '09: Proceedings of the 5th international conference on Emerging networking experiments and technologies Dec. 2009, 12 pages.

Qin, Feng et al., "LIFT: a Low-Overhead Practical Information Flow Tracking System for Detecting Security Attacks", 2006 39th Annual IEEE/ACM International Symposium on Microarchitecture (MICRO'06), Orlando, FL, Dec. 2006, 12 pages.

Suh. G. E. et al.. "Secure program execution via dynamic information flow tracking", Proceedings of the 11th International Conference on Architectural Support for Programming Languages and Operating Systems, ASPLOS 2004, Oct. 2004, 14 pages.

Tian, KE et al., "Prioritizing Data Flows and Sinks for App Security Transformation", Computers & Security Journal 92:101750, Feb. 2020, 13 pages.

Zhu, David et al., "TaintEraser: Protecting Sensitive Data Leaks Using Application-Level Taint Tracking", Article in ACM SIGOPS Operating Systems Review Jan. 2011, 13 pages.

* cited by examiner

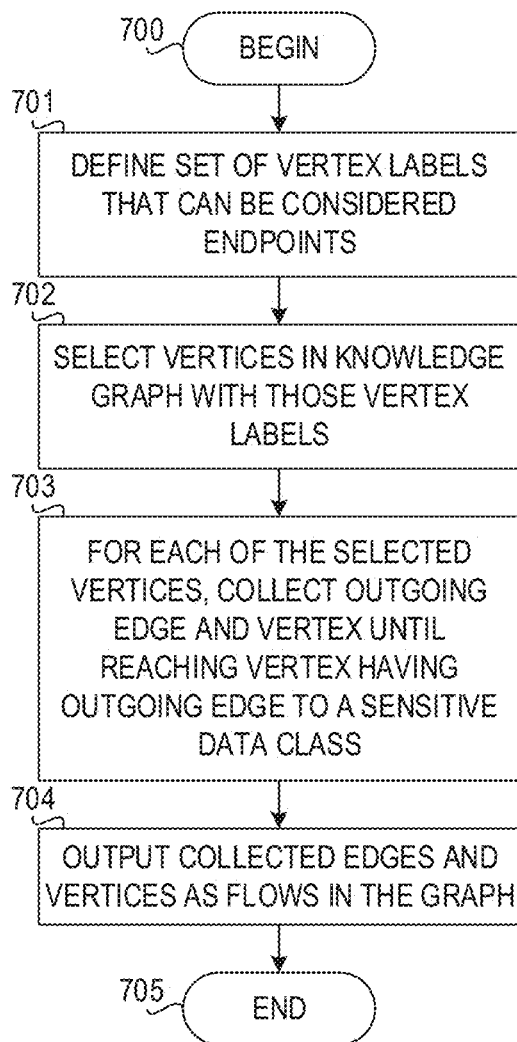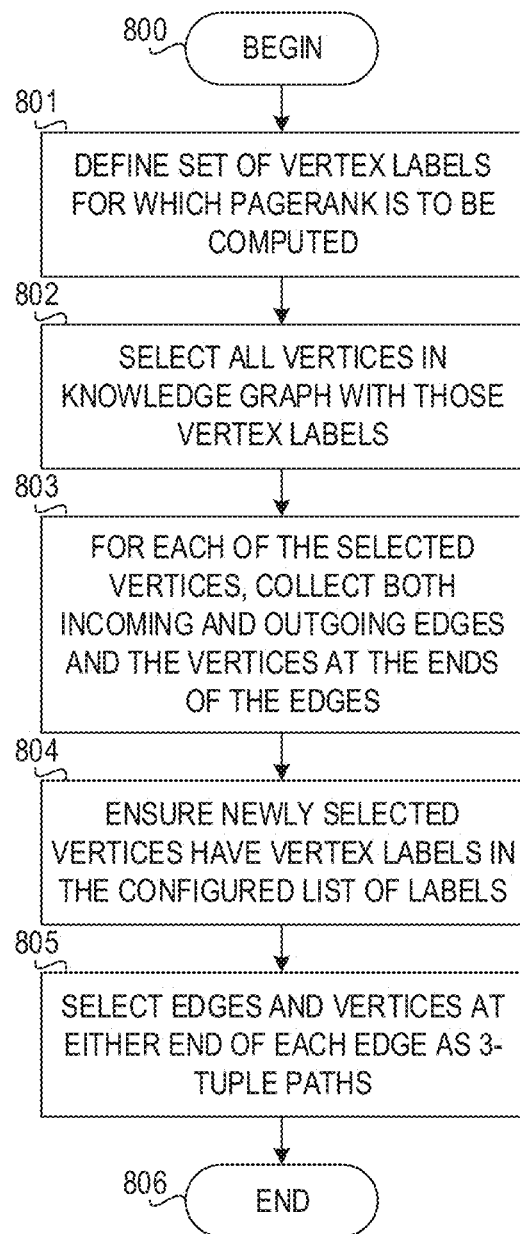

IDENTIFYING SENSITIVE DATA RISKS IN CLOUD-BASED ENTERPRISE DEPLOYMENTS BASED ON GRAPH ANALYTICS

BACKGROUND

The present application relates generally to an improved data processing apparatus and method and more specifically to mechanisms for identifying sensitive data risks in cloud-based enterprise deployments based on graph analytics.

Information sensitivity is the control of access to information or knowledge that might result in loss of an advantage or level of security if disclosed to others. Loss, misuse, modification, or unauthorized access to sensitive information can adversely affect the privacy or welfare of an individual, trade secrets of a business or even the security and international relations of a nation depending on the level of sensitivity and nature of the information.

Data privacy concerns exist in various aspects of daily life wherever personal data is stored and collected, such as on the internet, in medical records, financial records, and expression of political opinions. In over eighty countries in the world, personally identifiable information (PII) is protected by information privacy laws, which outline limits to the collection and use of personally identifiable information by public and private entities. Such laws usually require entities to give clear and unambiguous notice to the individual of the types of data being collected, its reason for collection, and planned uses of the data. In consent-based legal frameworks, explicit consent of the individual is required as well.

Computer security is information security applied to computing and network technology. Computer security is a significant and ever-growing field in computer science. The term computer insecurity, on the other hand, is the concept that computer systems are inherently vulnerable to attack, and therefore an evolving arms race between those who exploit existing vulnerabilities in security systems and those who must then engineer new mechanisms of security.

A number of security concerns have arisen in recent years as increasing amounts of sensitive information at every level have found their primary existence in digital form. At the personal level, credit card fraud, internet fraud, and other forms of identity theft have become widespread concerns that individuals need to be aware of on a day-to-day basis. The existence of large databases of classified information on computer networks is also changing the face of domestic and international politics. Cyber-warfare and cyber espionage are becoming increasingly important to the national security strategies of nations around the world.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for identifying sensitive data risks in cloud-based deployments. The method comprises building a knowledge graph based on data schema information for a cloud-based computing environment, a set of parsed infrastructure logs, and a set of captured application queries. The method further comprises identifying a set of sensitive flows in the knowledge graph representing paths from a sensitive data element to an endpoint in the knowledge graph. The method further comprises scoring the set of sensitive flows based on a scoring algorithm and issuing an alert to an administrator in response to a score of a sensitive flow within the set of sensitive flows exceeding a threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In another illustrative embodiment, a method is provided in a data processing system for identifying sensitive data risks in cloud-based deployments. The method comprises parsing infrastructure logs for a cloud-based computing environment to identify one or more applications deployed in the cloud-based environment and one or more users authenticating to the one or more applications. The method further comprises capturing queries the one or more applications to one or more data stores in the cloud-based computing environment. The method further comprises building a knowledge graph based on data schema information for the cloud-based computing environment, the parsed infrastructure logs, and the captured queries. The method further comprises identifying a set of sensitive flows in the knowledge graph representing paths from a sensitive data element to an endpoint in the knowledge graph. The method further comprises ranking the set of sensitive flows to form a ranked set of sensitive flows based on a scoring algorithm and outputting the ranked set of sensitive flows.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is a flowchart illustrating operation of a mechanism for identifying a flow in a graph in accordance with an illustrative embodiment;

FIG. 8 is a flowchart illustrating operation of a mechanism for creating a subgraph in accordance with an illustrative embodiment;

DETAILED DESCRIPTION

Figure 1:
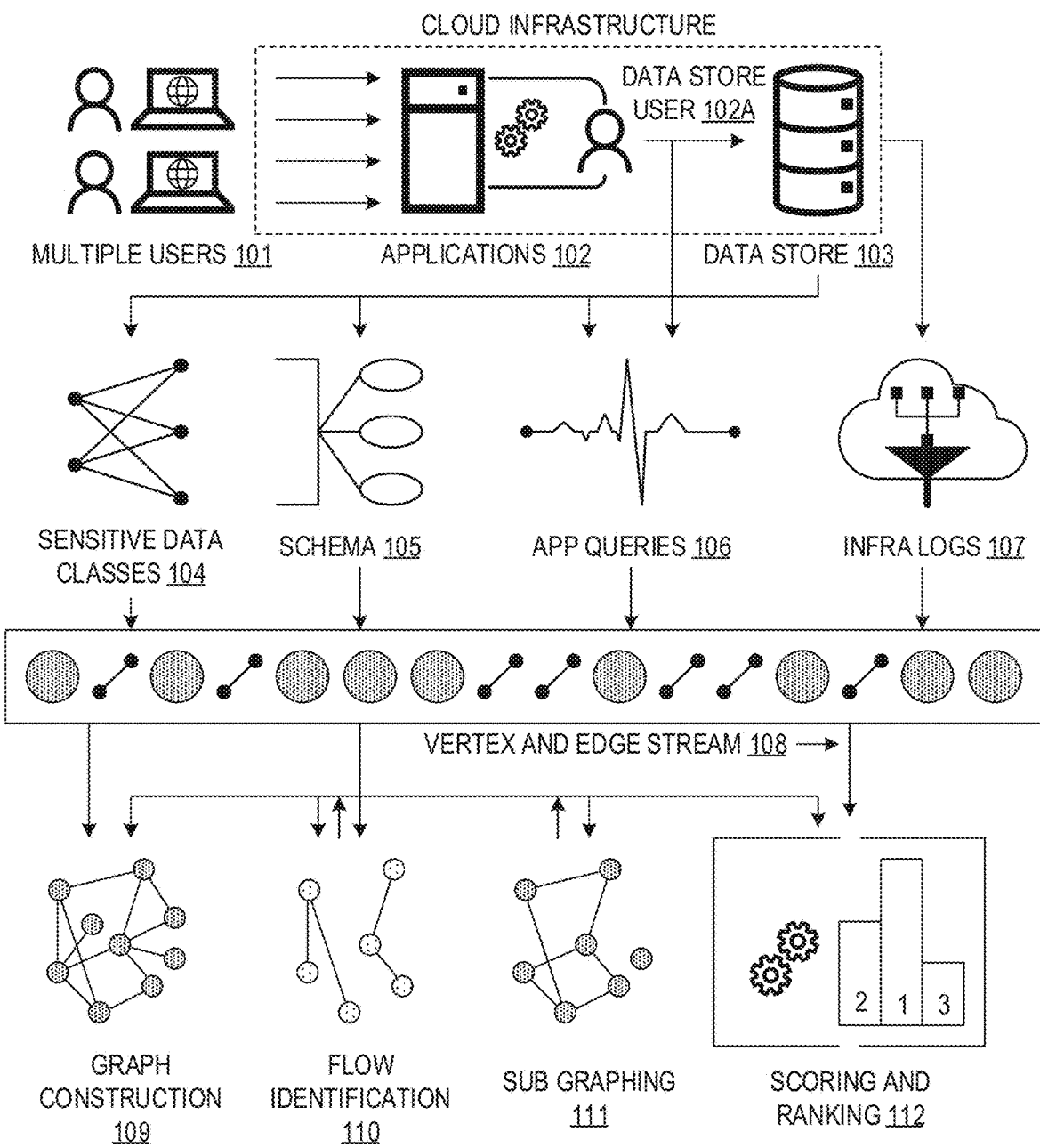
FIG. 1 depicts graph construction steps in accordance with an illustrative embodiment.

Most institutions, industries, and governments today deal with sensitive data in one form or another. These could be data about: (i) their employees, customers, patients, etc. (ii) data about internal secrets, intellectual properties, etc. (iii) or even data owned by other entities. The broad term "sensitive data" is used to denote data that can result in any loss (financial, reputational, compliance, etc.) to the entity holding the data. This means, sensitive data includes both personally identifiable information (PII) as well as confidential information. Entities that deal with such information struggle with identifying sensitive data and its impact on rest of their systems. This is even more relevant in the context of data protection laws like The General Data Protection Regulation (EU) 2016/679 (GDPR), California Consumer Privacy Act (CCPA), and more. A real time view of how data moves through distributed sets of applications and corresponding infrastructure is essential to identify potential risks, compliance levels and impact of breaches related to sensitive data. This capability becomes challenging as adoption of extremely diverse cloud native application stacks increase.

Risks to sensitive data in an organization change and evolve with application deployments, users on-boarded, changes to asset ownership etc. There is a need for effective techniques that help understand such changes and quantify related risks. When effective, such techniques can help identify and tackle multiple security issues. Organizations may have employees with access to high volume of sensitive data because they belong to multiple roles. Or a need to identify applications or user actions that result in most harm if compromised. Such an understanding is important for proper threat modeling and risk or impact analysis. It is difficult to answer these and other important security questions because relevant information is hidden in messy architectures or high volumes of data. The illustrative embodiments take a data flow centered approach to tackle the problem of identifying privacy hazards in cloud-based environments. The illustrative embodiments leverage advances in data classification and repurpose ideas from information flow to codify and prioritize how sensitive data move through different applications, users, or other entities. The illustrative embodiments shift the focus from attack detection and mitigation to understanding and prioritizing movement of sensitive data.

Many organizations have adopted cloud-based and containerized application development paradigms. This brings about faster build, deploy, run cycles as well as a diverse array of applications. Each of these applications in turn may be built with different libraries, tools, technologies, and security guarantees. Such a dynamic environment makes understanding and prioritizing data movement a difficult problem by itself. It is important to know the type and granularity of information to capture, underlying systems that can provide such capability, and analytics that organize this information into a consumable form.

Information graphs that capture such data flows have been studied in the context of threat analysis, taint checking, and more. While the granularity of information tracked by such graph-based approaches vary from low level registers to entire databases, prior work does not identify an implementable, practical granularity that works best for cloud native environments. Cloud based development models piece together software from many smaller, already available, open components. This means that performing end to end static analysis is often impractical. Further, requirements of a data control or compliance officer are often at odds with a developer who is focused on adding features to an application. For example, a data officer may be interested in knowing the different applications in an organization that utilize customer phone number (PII) as well as how and when it is used. This simple requirement may involve interviews with multiple application architects or outside vendors to solve. Current needs of cloud-based data privacy, safety, and compliance demand stronger abstractions and techniques to reason about data combined with its use and relevance.

The illustrative embodiments enable data researchers, data officers, and analysts to easily understand and express what is happening with their sensitive data and to manage their privacy hazards. More specifically, the illustrative embodiments provide mechanisms to:

1) Codify ground truths about sensitive data movement and data into one simple abstraction.

2) Codify temporal changes to data movement that would allow monitoring and alerting.

3) Help data officers to identify and prioritize sensitive data classes (e.g., PII, trade secrets) that are most relevant for them.

4) Help data officers identify applications or users that are at a higher risk in case of an attack or exposure.

5) Allow prioritizing remedial action and provide enough context and detail to do the actual remediation.

6) Provide the ability to customize the techniques to suit individual scenarios or business use cases.

7) Help security analysts perform impact analysis, threat, and risk modeling.

The illustrative embodiments provide a sensitive data risk identification engine in a cloud computing data processing system to capture data flows at the granularity of data elements that can be identified by state-of-the-art data classifiers. The sensitive data risk identification engine can identify the data element to be of a certain type like name or email address. Such data elements could be a column in a database table or a text or JavaScript™ Object Notation (JSON) document. JAVASCRIPT is a trademark of Oracle Corporation in the United States, other countries, or both. The illustrative embodiments provide a practical, graph-based abstraction referred to as "Flow" herein, and techniques for building and utilizing this abstraction. Flows codify data moving between entities in space and time, which are leveraged to identify and prioritize risks related to sensitive data. The sensitive data risk identification engine shows the (i) type and granularity of information needed to build Flows, (ii) underlying systems that can provide the required information, and (iii) systems and analytics that organize Flows across spatial and temporal dimensions into a consumable form. The techniques of the illustrative embodiments take the responsibility of identifying sensitive data and its interactions away from the developers to a cloud infrastructure level.

First, the illustrative embodiments use advances in data classification and application deployment to efficiently capture the sensitivity of data and their relations. For this, the sensitive data risk identification engine of the illustrative embodiments relies heavily on state-of-the-art discovery and classification tools, as well as information flow capture techniques. The sensitive data risk identification engine captures the relations between users, applications, data elements they interact with (columns or documents), their geographic locations, etc. This task is tuned to work well with the widespread adoption of cloud native application building techniques, which use containers, container management platforms, and centralized logging frameworks. The relations are captured as a knowledge graph, where vertices are data elements, their data classes (email, SSN, etc.), and entities that operate on data elements (applications, users etc.). Edges in this knowledge graph represent different ways in which these entities are connected, like data reads, user logins etc. From this knowledge graph, the mechanisms of the illustrative embodiments identify Flows, which are data paths that start at data elements (source) and end at applications, users, etc.

This data path abstraction is referred to as "Flow" (with capital 'F') and distinguishes between the term flow used to refer to an information or data path. Flows allow the sensitive data risk identification engine to perform detailed risk and impact analysis of sensitive data. Flows can also determine policy compliance or impact of policy changes and breaches. For instance, to evaluate impact of a specific privacy regulations on a specific type of data (e.g., PII), the mechanisms of the illustrative embodiments start with the data class of interest. The sensitive data risk identification engine can then move along all Flows in that data class to see impacted applications and systems.

Flow can be shown to be a strong abstraction by demonstrating techniques to score Flows on different privacy and security dimensions. Each dimension captures different but relevant properties of a Flow. For example, one dimension tracks if data crossed geopolitical boundaries. This would be relevant for a GDPR compliance analysis. Another dimension tracks the influence a specific Flow has on overall data movement. The temporal dimension captures changes to data flow patterns. For example, a Flow may intersect with other entities briefly. This dimensional flexibility makes the techniques valuable to a variety of privacy and security processes. Finally, the techniques show how scores along different dimensions can be combined to rank all the different Flows. This allows organizations to track their top data movements and changes to it over time.

Before beginning the discussion of the various aspects of the illustrative embodiments and the improved computer operations performed by the illustrative embodiments, it should first be appreciated that throughout this description the term "mechanism" will be used to refer to elements of the illustrative embodiments that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices to implement the functionality or perform the operations associated with the specific "mechanism." Thus, the mechanisms described herein may be implemented as specialized hardware, software executing on hardware to thereby configure the hardware to implement the specialized functionality of the illustrative embodiments, which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" regarding particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein to describe embodiments and features of the invention, is not intended to be limiting of any implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the illustrative embodiments.

As used herein, the term "sensitive entities" refers to components like applications, databases, and users that interact with sensitive data. This distinction is made because the focus is not on entities that are susceptible to attacks (identifying vulnerabilities) or under active attack (threats).

Data Classification

The first step to identify sensitive data is to classify data elements (structured or unstructured) into their corresponding data classes. For example, by looking at a column name and data within that column, a structured data classifier can identify the data class of that column. The data class of such a column could be an SSN, date of birth, email address, etc. Prior work in this domain shows that it is possible to identify such sensitive data with good precision and low false positives. Unstructured data classification techniques allow similar ability over documents, JSON, blobs, and more general schema less data as well. For these, named entity recognition (NER) techniques provide the ability to tag entities in text with their corresponding type or class. The illustrative embodiments exploit the advances and ease of adoption that have occurred in the field and use off-the-shelf data classifiers.

Information Flow Analysis

Tracking how information flows through a system has been studied under various contexts. This can be done as static data flow analysis of programs as well as dynamic flow analysis that looks at network or application data. Most of these fall under static or dynamic taint analysis. Taint analysis looks at how a variable or a data element in memory or disk (taint source) is propagated through a system. For example, if a variable is set by a field in a web form it can be considered tainted. If that variable is used in an expression that sets a second variable, the taint is propagated to that second variable. If any of these tainted variables are used to execute a command (taint sink) then the command is flagged as dangerous. This is useful to identify structured query language (SQL) injection attacks, remote code execution, privacy violations, and more. This technique can be applied for tracking sensitive data by considering sensitive data elements as taint sources. Taint sinks in this case will be points where data leaves the system (e.g., network, user). The Flow abstraction of the illustrative embodiments represents paths between taint sources and sinks.

Monitoring transport or network layer packets can also be used to identify data flow patterns. Such techniques have been used to find data leaks, advanced persistent threats (APTs), etc. Though extremely useful, such techniques do not give a sense of what is currently happening with sensitive data in systems under steady use. For example, if an application is reading from a database, such techniques can identify the connection between the database and the application but will not be able to distinguish between different data classes and their priorities. This means if a data officer wants to find out the impact of PII in a cloud environment, the officer will not have the required information.

Systems and Environment

Today data and compute comprise of multiple applications, services, and data store(s), all interacting with one another and often in the cloud. The term "environment" is used to broadly refer to a setting where multiple systems, applications, and infrastructure components coexist. The mechanisms of the illustrative embodiments rely on a few core features of such environments for constructing the knowledge graph that underpins our work. These are described in further detail below.

The sensitive data risk identification engine of the illustrative embodiments parses application and infrastructure logs, as described in further detail below, to identify relationships between data and sensitive entities. Centralized log management stacks available as open-source offerings or pre-packaged by cloud providers make this task easier. One implementation relies on logs from container management platforms to identify new application being deployed. If such a platform is not being used, configuration management tools or manual exports of known applications or systems in the environment can be used. Details of end users who use the environment and applications in it can be obtained from identity and access management (IAM) frameworks. Public or private cloud providers offer IAM as a standardized, out-of-the-box service. Most large-scale enterprises also have corporate directories that can be integrated into such a service. If an IAM service is not being used, application logs can be instrumented to propagate user login and access information. Though this implementation primarily looks at applications deployed in private or public clouds, the principles presented here are applicable to all application deployments and environments.

Graph Notations

To express the graph-based algorithms, the illustrative embodiments rely on notations inspired from Gremlin, a widely adopted graph query (traversal) language. Gremlin is a functional, data flow language that enables complex queries of the knowledge graph to be expressed succinctly. Consider the SQL query below, which calculates the total number of movies released by different movie studios:

select studio, count (movie) from movies
    group by studio;

The corresponding Gremlin query is given as follows:

G.V( ).hasLabel('movie')
    .groupCount( ). by ('studio')

This query begins with the full graph G and picks vertices with a specific label (hasLabel ('movie')), from the full set of vertices (G.V( )). A grouping operation is then performed using a vertex level property key (by ('studio')). Gremlin is used here only as pseudo code for illustrative purposes.

Data Flow

Overview

In order to identify how data move through an environment, the mechanisms of the illustrative embodiments capture the different data elements, entities that operate on those data elements, and their interactions, in a knowledge graph. FIG. 1 depicts the steps and components involved in constructing the graph in accordance with an illustrative embodiment. A typical cloud-based application will have multiple users 101 connecting to the application 102 and the application connecting to a data store 103 for persistence.

Application and infrastructure logs along with metadata provide the basic building blocks for the knowledge graph. Off-the-shelf data classifiers 104 identify sensitivity level of the data elements.

Data schema information 105, when available, provide even more additional context. For example, if data is stored in traditional databases with well-defined schemas, details of columns in tables as well as primary and foreign key constraints identify relationships between data elements. Infrastructure logs 107 are parsed to identify new applications being deployed, or new users authenticating to the application. New users can be inferred from identity and access management (IAM) services, when available. Finally, the mechanisms of the illustrative embodiment need to know the actual queries 106 the application is issuing to the data store 103. This information is captured either from a proxy, which mediates all activity to the data store, or if supported by the store, directly from the transaction logs. Each of these inputs 104-107 are parsed to identify entities that correspond to vertices in the graph or relations that correspond to edges. The log parsers that process these inputs are stateless and unaware of the structure or state of the knowledge graph. They generate a stream of potential vertices and edges, which are consolidated into the graph during graph construction 109. If a vertex identified by the parser already exists in the graph, it is not inserted again, but properties of the vertex, like updated_ts and frequency, are updated.

The illustrative embodiment identifies Flows in the graph during Flow identification 110. Flow identification 110 is described in further detail below with reference to FIG. 4. The illustrative embodiment also performs sub graphing 111 to create subgraphs to compute PageRank scores, as will be described below. Sub graphing 111 is described in further detail below with reference to FIG. 5. The embodiment performs scoring and ranking 112, at least based on the vertex and edge stream 108, which allows the illustrative embodiment to generate visualizations and graphical user interfaces to surface privacy related data flows in a way that can support threat modelling and risk mitigation processes adopted by security officers and analysts. Scoring and ranking 112 serves as a prioritization mechanism for these processes.

Figure 2:
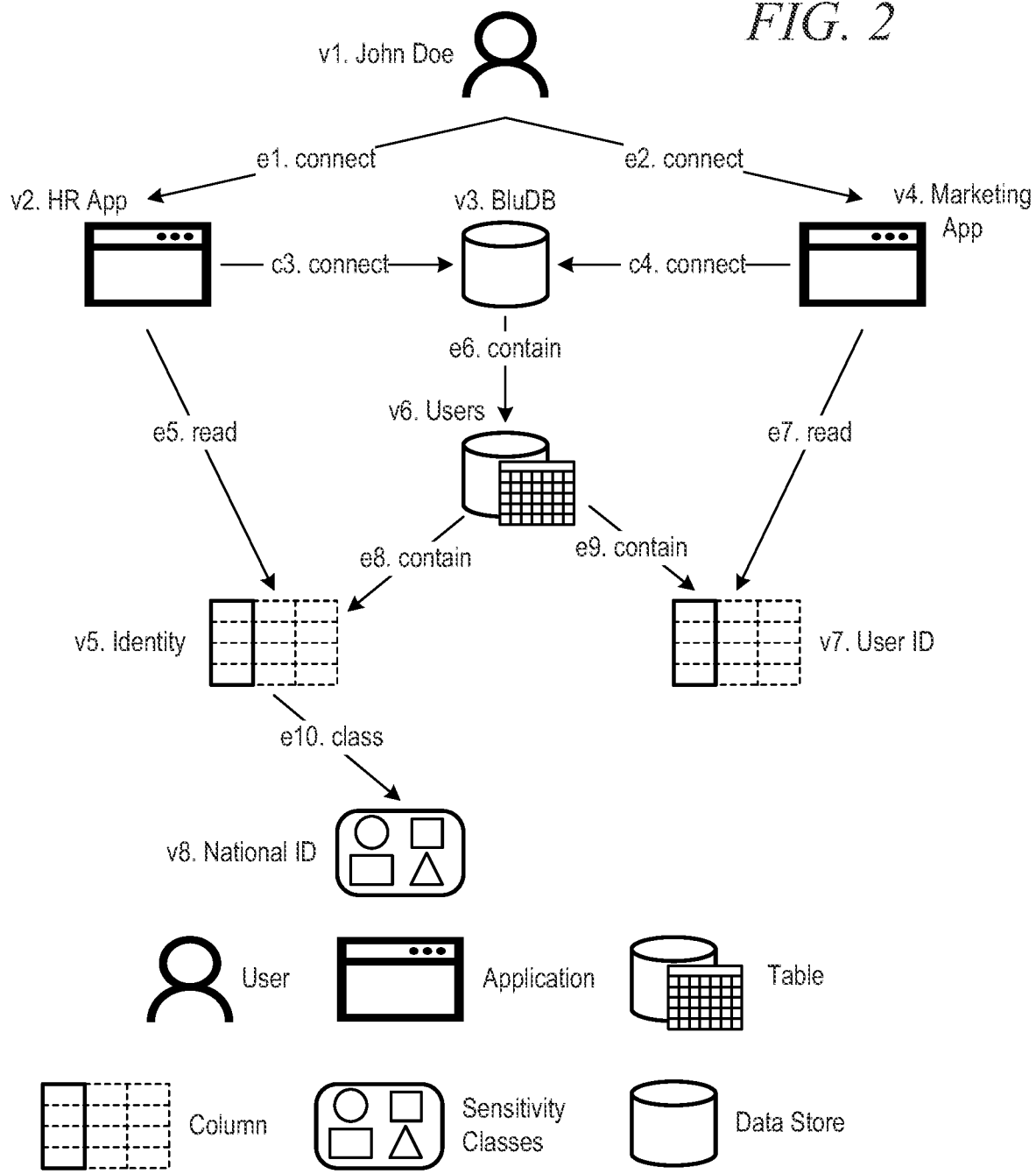
FIG. 2 illustrates a sample graph in accordance with an illustrative embodiment.

FIG. 2 illustrates a sample graph in accordance with an illustrative embodiment. The graph shows a user John Doe (vertex v1) who logged in (or connected) to two different applications: an HR App (vertex v2) and a Marketing App (vertex v4). Both user and app vertices are created by parsing infrastructure logs (107 in FIG. 1). The set of vertices BluDB (v3), Users (v6), Identity (v5), User ID (v7), and the edges that connect them are created by reading the data store metadata (105 in FIG. 1). In this example, the data classifier that analyzed the data identified an Identity column of data class national identifier (e.g., SSN). The HR App issues a runtime query to read from the Identity column of the Users table and the Marketing App reads from the User ID column. These edges are created by component 106 in FIG. 1.

In summary, the vertices of the graph represent entities (virtual or physical) that data pass through. Vertices are of different types and are labeled as such. The term "label" is used rather than "type" whenever possible to avoid confusion between type systems for graphs where every vertex has a type and operations are restricted to vertices of a certain type.

The most common vertex labels in the knowledge graph are: 1) Application, 2) Data Store, 3) User, 4 Table, 5) Column, and 6) Host. Edges of the knowledge graph are also labeled, and the edges represent interactions between the entities at runtime or design time (e.g., a column associated with a table in a data store). The different edge labels used are: 1) connect, 2) contain, 3) class, 4) read, 5) write, 6) refer, and 7) identify. The solution does not rely on the knowledge graph having this specific schema. The vertex labels are used as configuration inputs that define the kind of data movements to focus on. Vertex labels are also used as visualization helpers in the illustrative embodiment. This allows data officers or analysts to better understand data paths.

Figure 3:
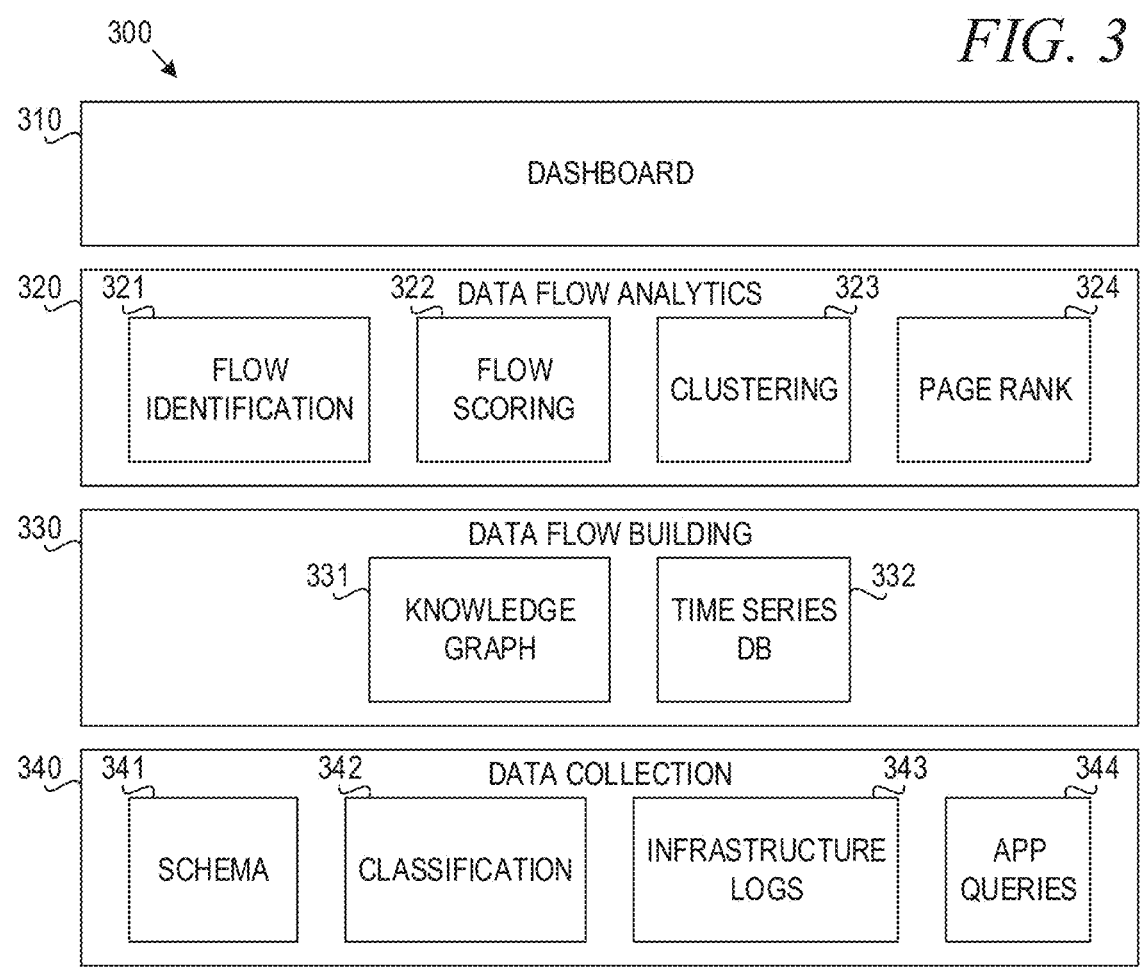
FIG. 3 is a block diagram of a sensitive data risk identification engine in accordance with an illustrative embodiment.

FIG. 3 is a block diagram of a sensitive data risk identification engine in accordance with an illustrative embodiment. The sensitive data risk identification engine 300 comprises a dashboard 310, data flow analytics components 320, data flow building components 330, and data collection components 340. In the depicted example, data collection components 340 collect data from data schema information component 341, classification component 342, infrastructure logs component 343, and application queries component 344. For example, schema information component 341 may parse schema information for details of columns in tables as well as primary and foreign key constraints to identify relationships between data elements. Classification component 342 may use classifiers to identify sensitivity level of the data elements. Infrastructure logs component 343 parses infrastructure logs for the cloud-based computing environment to identify one or more applications deployed in the cloud-based environment and one or more users authenticating to the one or more applications. Application queries component 344 capturing queries the applications submit to data stores in the cloud-based computing environment.

Data flow building components 330 build knowledge graph 331 and time series database 332. Data flow building component 330 build knowledge graph 331 based on the data schema information for the cloud-based computing environment, the parsed infrastructure logs, and the captured queries. Vertices and edges identified by data collection components 340 are added to time series database 332, before being inserted into the knowledge graph 331.

Data flow analytics components 320 include flow identification component 321, flow scoring component 322, clustering component 323, and page rank component 324. Flow identification component 321 identifies Flows in knowledge graph 331. Flow identification is described in further detail below with reference to FIG. 4. Flow scoring component 322 calculates scores for the identified Flows and ranks the set of Flows to form a ranked set of Flows. Clustering component 323 uses graph clustering algorithms (e.g., peer-pressure clustering or highly connected subgraphs) to identify vertices that belong to the same cluster or group. Clustering component 323 determines group intersection, which is used by Flow scoring component 322. Page Rank component 324 computes Personalized PageRank scores as a measure used by Flow scoring component 322.

Dashboard component 310 generates a graphical user interface (GUI) to help convey priorities in a fast and effective way. In one example embodiment, the dashboard component 310 shows the geographical location of different components of a Flow, overall Flow scores, and ranked Flows along each dimension. In one example embodiment, sensitive data elements are grouped by geography and presented on a world map to provide an at-a-glance view of where privacy related sensitive data resides and how that data is flowing. In another example embodiment, Flows are compared to a threshold, and the GUI issues alerts to administrators in response to one or more Flows exceeding the threshold.

Figure 4:
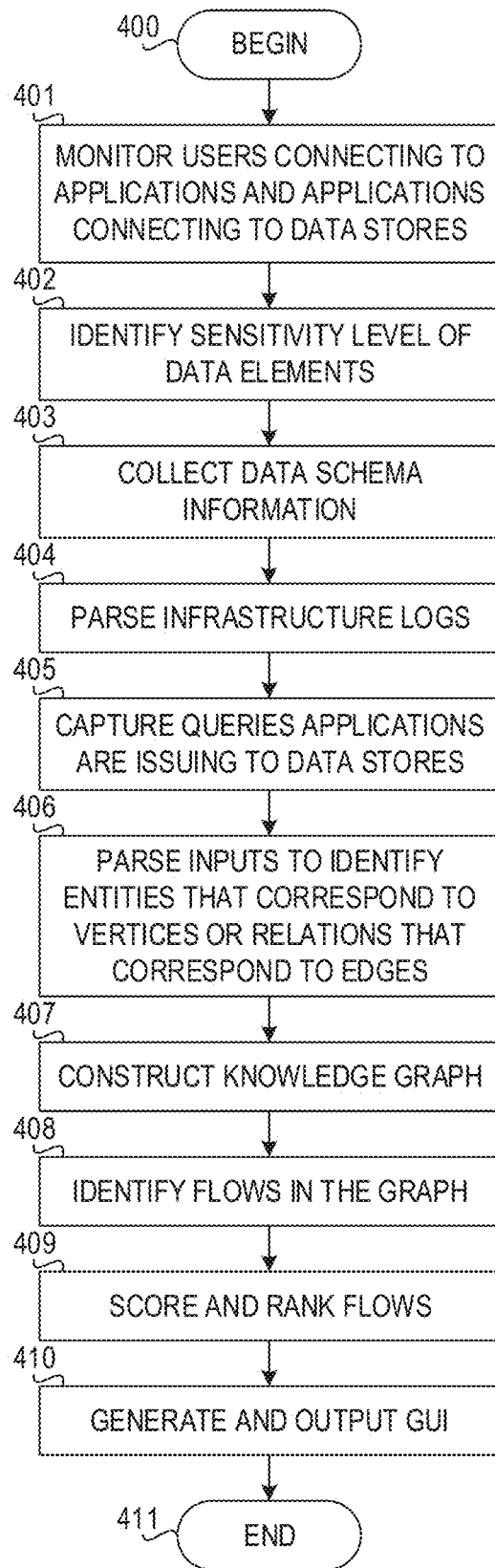
FIG. 4 is a flowchart illustrating operation of a mechanism for identifying sensitive data risks in cloud-based enterprise deployments based on graph analysis in accordance with an illustrative embodiment.

FIG. 4 is a flowchart illustrating operation of a sensitive data risk identification engine for identifying sensitive data risks in cloud-based enterprise deployments based on graph analysis in accordance with an illustrative embodiment. Operation begins (block 400), and the sensitive data risk identification engine monitors users connecting to applications and applications connecting to data stores for persistence (bock 401). The sensitive data risk identification engine identifies sensitivity levels of data elements (block 402). In one example embodiment, off-the-shelf classifiers are used to identify sensitivity levels.

The sensitive data risk identification engine then collects data schema information (block 403). When available, data schema information provides additional context. The sensitive data risk identification engine parses infrastructure logs to identify new applications being deployed or new users authenticating to the applications (block 404). In one example embodiment, new users can be inferred from identity and access management (IAM) services. The sensitive data risk identification engine also captures queries that applications issue to data stores (block 405). In one embodiment, this can be captured from a proxy that mediates all activity to the data store or from transaction logs directly if supported by the data store. While the flowchart of FIG. 4 shows blocks 403, 404, 405 being performed in series, these blocks may be performed in parallel in the illustrative embodiment.

The sensitive data risk identification engine parses inputs described above with reference to blocks 402-405 to identify entities that correspond to vertices and relations that correspond to edges (block 406). The sensitive data risk identification engine then constructs the knowledge graph (block 407) and identifies Flows in the graph (block 408). A Flow is a path from a sensitive data element to an endpoint. Any vertex label that logically represents the final step of data movement can be an endpoint. The sensitive data risk identification engine scores and ranks the identified Flows (block 409). To achieve this, the sensitive data risk identification engine looks at various dimensions of a Flow and assigns scores for each dimension. Some dimensions are computed by first considering the vertices in the Flow individually (centrality, influence) and then aggregating to arrive at the Flow level score. Others are computed by considering the Flow as a whole. Ranking flows helps organizations to prioritize remediation, understand most utilized data classes, etc. To order and rank the different Flows, the sensitive data risk identification engine first identifies temporal changes to Flows using Flow Intersections, which is described in further detail below. This temporal information is then combined with the scores computed along each dimension to obtain an overall Flow ranking. The sensitive data risk identification engine generates and outputs a graphical user interface (GUI) (block 410). The GUI helps to convey priorities in a fast and effective way. In one example embodiment, the GUI shows the geographical location of different components of a Flow, overall Flow scores, and ranked Flows along each dimension. In one example embodiment, sensitive data elements are grouped by geography and presented on a world map to provide an at-a-glance view of where privacy related sensitive data resides and how that data is flowing. In another example embodiment, Flows are compared to a threshold, and the GUI issues alerts to administrators in response to one or more Flows exceeding the threshold. Thereafter, operation ends (block 411).

Figure 5:
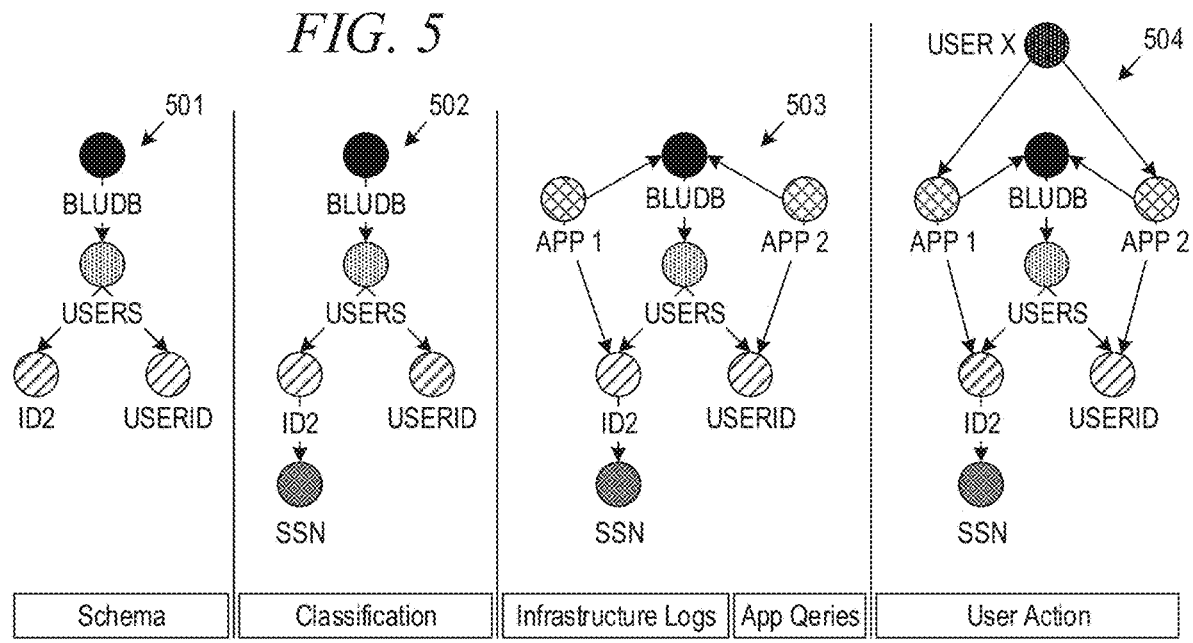
FIG. 5 illustrates an example of knowledge graph construction in accordance with an illustrative embodiment.

FIG. 5 illustrates an example of knowledge graph construction in accordance with an illustrative embodiment. Knowledge graph 501 is based on data schema information. Graph 501 illustrates a data store vertex (BLUDB) storing data elements for USERS, which contain data elements of ID2 and USERID. Knowledge graph 502 is based on classification. In the depicted example, graph 502 includes a data element for SSN, which classified under ID2. Then, graph 503 is constructed based on parsing of infrastructure logs and captured application queries. In the depicted example, graph 503 includes a vertex for APP 1, which connects with BLUDB and reads ID2, and a vertex for APP 2, which connects with BLUDB and reads USERID. Finally, graph 504 is constructed in response to USER X connecting with APP 1 and APP 2.

Data Flows

Building the knowledge graph is the first step towards identifying sensitive data risks in cloud-based enterprise deployments. It is also important to understand how different actions, data elements, and sensitive entities interact. For example, an application reading transaction information identified only by a customer identifier may not be a privacy risk. However, if the application reads transaction information along with customer information, then both actions must be considered as potential risks. This also means identifying a single vertex in the knowledge graph as a problem vertex is not sufficient. Isolating a vertex does not help identify what action is leading to the problem or if that action intersects with another that is problematic or what can be done to remedy the problem. This is where the notion of a Flow becomes relevant.

A Sensitive Flow or simply Flow is defined as a path from a sensitive data element to an endpoint. Any vertex label that logically represents the final step of data movement that we have visibility into can be an endpoint (sink). The illustrative embodiment uses User and Application vertices as endpoints. If, for instance, there is an environment where there is no visibility into users logging into the application and it is not possible to meaningfully add User vertices to the graph, then application vertices alone can act as endpoints. The starting point (source) of a flow is the finest granular data element that can be tracked, which in this example are vertices with label column. If there is unstructured or semi-structured data (e.g., documents in a file system or json files), then vertices that represent individual documents could be starting points of Flows.

Figure 6A:
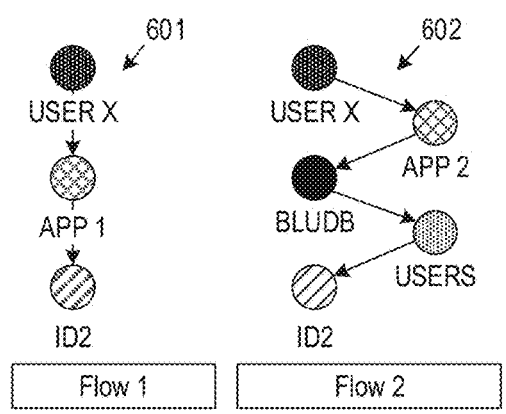
FIGS. 6A and 6B illustrate an example of Flow identification in a knowledge graph in accordance with an illustrative embodiment.
Figure 6B:
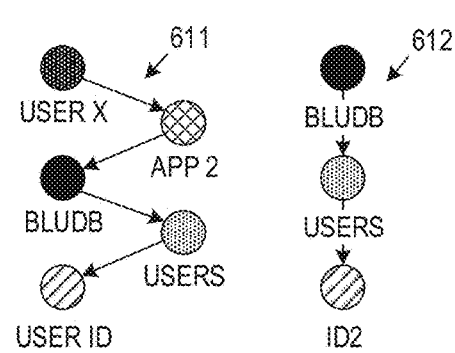

FIGS. 6A and 6B illustrate an example of Flow identification in a knowledge graph in accordance with an illustrative embodiment. Given the knowledge graph constructed in FIG. 5, the illustrative embodiments identify paths between sensitive data elements and configured endpoints (e.g., users, apps). For example, if the ID2 vertex is classified as a sensitive data element because it contains a social security number (SSN), then Flow 1 601 and Flow 2 602 are identified as being paths between USER X and ID2, as illustrated in FIG. 6A. On the other hand, as illustrated in FIG. 6B, paths 611, 612 are not identified as Flows for scoring, because paths 611, 612 are not paths between sensitive data elements and configured endpoints. That is, USERID is not classified as a sensitive data element, and BLUDB is not a configured endpoint (user or application).

The sample graph in FIG. 2, has three different Flows in it as shown below.

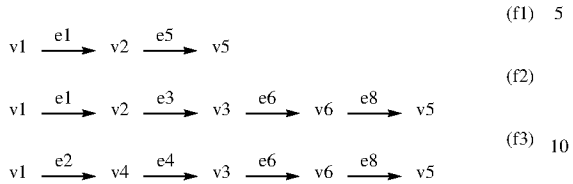

(f1)
(f2)
(f3)

Note that even though vertex v7 is a data element with label column, paths to v7 are not considered as Flows because v7 was not associated with a sensitive data class. Each vertex and edge of the graph maintains a list of properties and a label denoting the type of the vertex. This representation is formalized with a generic definition of a directed graph G=(V, E, Φ), where V is a set of vertices, E is a set of edges, and Φ is a labeling function such that:

$v \in V | \Phi(v)$ is a label of v, $E \subseteq \{(x,y) | (x,y) \in V^2 \vee x \neq y \}$, $e \in E | \Phi(e)$ is a label of e Given graph G=(V, E, Φ, Ω), where V, E, Φ are defined as above, and Ω is a set of configured endpoint labels, a Flow f is given by a finite sequence of edges $(e_1, e_2, \ldots, e_{n-1})$, with finite sequence of vertices $(v_1, v_2, \ldots, v_n)$ for which:

$e_i = (v_i, v_{i+1})$ for $i \in \{1, 2, \ldots, n-1\}$ $v_i \neq v_j$ for distinct $i, j \in \{1, 2, \ldots, n\}$ $\Phi(v_n) \in \Omega$ set of Flow end labels Based on this definition, the mechanism of the illustrative embodiment derives a Flow in the graph G. FIG. 7 is a flowchart illustrating operation of a mechanism for identifying a flow in a graph in accordance with an illustrative embodiment. Operation begins (block 700), and a set of vertex labels that can be considered endpoints are first defined (block 701). Then, all vertices in the knowledge graph with those vertex labels are selected (block 702). For each of the selected vertices, the mechanism collects the outgoing edge and vertex until the mechanism reaches the vertex that has an outgoing edge to a sensitive data class (block 703). The edges and vertices collected are outputted as the Flows in the graph (block 704). Thereafter, operation ends (block 705).

Graph and Edge Properties

Along with labels, each vertex or edge in the graph can be annotated with a property set of key value pairs. The common properties associated with vertices are as follows:

location: This vertex property represents the geographic location of the entity represented by the vertex. This is primarily derived from infrastructure logs (106 in FIG. 1). Typically, there will be one instance of a container management platform for each data center. This means all vertices identified from a specific infrastructure log can be given the geographic location of the data center. Location property can also be derived from inspecting SSL certificates or explicit configuration parameters.

firstseen and updated time stamps: The firstseen property of a vertex or edge is set to the timestamp when it is first created. If the vertex or edge reoccur in the stream, the updated property is set as the new time stamp when it recurred.

frequency: If a vertex or edge relationship between two vertices reoccur after it has been added to the knowledge graph, the mechanism increments the corresponding frequency property.

SubGraphing

Rather than tailor the graph schema to specific analytics, the illustrative embodiments use a schema that best captures the relations between the different entities that make up an environment. This schema can also be dynamic depending on the environment that is under consideration. Once the relations are meaningfully captured, the mechanisms of the illustrative embodiments create subgraphs that best suit the different analytics described in further detail below.

Scoring

One goal of the illustrative embodiments is to understand which of the identified Flows pose a higher risk to the organization or owner of the environment. To achieve this, the illustrative embodiments look at various dimensions of a Flow and assign scores for each dimension. These different dimensions and how they are computed are described below. Some dimensions are computed by first considering the vertices in the flow individually (centrality influence) and then aggregating them to arrive at the flow level score. Others are computed by considering the flow as a whole.

Centrality

The illustrative embodiments are based on the premise that if a specific vertex is more central in the graph, then it can be considered riskier. More specifically, if looking at an Application vertex, a higher centrality score means the vertex could be reading or writing from a larger number of sensitive data elements, connected to more data stores than its neighbors, etc. This means sensitive data elements could potentially concentrate at this vertex. From an impact perspective, if the entity corresponding to the given vertex is compromised, it could be more damaging than an entity with a very low centrality score.

The illustrative embodiment uses Personalized PageRank as the centrality measure. In the basic PageRank algorithm, a vertex evenly distributes its own PageRank score to the vertices it is connected to, and the algorithm iterates until convergence. PageRank of a vertex $v_i$ in a graph with N vertices is given by the following formula:

$$PR(v_i) = \frac{1-d}{N} + d \Sigma_{v \in inV(v_i)} \frac{PR(v)}{|outE(v)|}$$

Here, $inV(v_i)$ gives the set of vertices with incoming edges to $v_i$. $outE(v)$ gives the set of out edges of v. In other words, the PageRank value of vertex $v_i$ is dependent on the PageRank values for each vertex v contained in the set $inV(v_i)$, divided by the number of outgoing edges from vertex v. If the current vertex has no outgoing edges, a teleportation operation is performed which picks one of the V vertices in the graph at random. This teleport operation happens at random with a probability of d. In the original PageRank algorithm, d is the damping factor used to model the probability a random web surfer stops on a page. The mechanisms of the illustrative embodiments use the damping factor to model the probability that data read from a data element is not propagated further. In an example embodiment, a damping factor of 0.85 is used.

The illustrative embodiments use Personalized PageRank in which the teleportation operation picks from a given subset of vertices and not any random vertex of the graph. The mechanisms of the illustrative embodiments use the set of vertices identified as sensitive by the classifier as this subset to teleport to. This means vertices with a higher concentration of sensitive data translates to higher PageRank. PageRank can be used either in an unweighted form, as above, or in a weighted form. In the weighted form, the distribution of a vertex's PageRank to its neighbors $$\left(\frac{PR(v)}{|outE(v)|}\right)$$

is made proportional to the edge connection weights. This is useful in some cases where the existence of an edge between two vertices is given a probabilistic weight. As a final note, alternative embodiments can replace PageRank with any notion of centrality and still obtain similar meaningful results with minor variations.

Subgraph Construction

To compute PageRank score of vertices appropriately, the illustrative embodiments take a subgraph of the original graph G. PageRank can be computed for a subset of vertex labels as required by an organization or specific business use case instead of the whole graph. FIG. 8 is a flowchart illustrating operation of a mechanism for creating a subgraph in accordance with an illustrative embodiment. Operation begins (block 800), and the set of vertex labels for which PageRank is to be computed is first defined (block 801). Then all vertices in the knowledge graph with those vertex labels are selected (block 802). For each of the selected vertices, the mechanism collects both incoming and outgoing edges and the vertex at the other end of that edge (block 803). The mechanism ensures the newly selected vertices also have vertex labels in the configured list of labels (block 804). Finally, the mechanism selects the edges and vertices at either end of each edge as 3-tuple paths (block 805). Thereafter, operation ends (block 806).

Vertex Influence Using Expected Force

Centrality measures identify the most influential vertices in a graph but do not quantify the spreading power of sensitive vertices that may not be hubs. Typically, there will be a few vertices with high centrality scores and the rest of the vertices will have centrality scores within a very small range. This makes it difficult to distinguish them well. To get a better understanding of how a non-hub, but sensitive vertex can influence the rest of the vertices in the knowledge graph, the illustrative embodiments look at the expected force (ExF) metric. Though constructed primarily for epidemiological modeling, this metric fits the requirement when considering a sensitive vertex as an infection and attempting to understand its influence or spreading power.

Expected force is a per vertex measure and is derived from the local graph topology. It is independent of the rest of the knowledge graph or any specific spreading process. The expected force of a sensitive vertex i is given as follows:

$$E{\times}F(i)=-\Sigma_{j=1}{}^J \overline{d}_j \log(\overline{d}_j)$$

where $d_k$ is the degree of cluster k and $$\overline{d}_k = \frac{d_k}{\Sigma_J d_j}, k \in J.$$

To understand the equation, first consider a vertex identified as sensitive (e.g., vertex v5, identified to be of type National Id in FIG. 2). Ignore edge direction and assume the rest of the vertices could potentially be connected (or tainted) with v5. Then enumerate all possible clusters 1, . . . , J to which v5 could spread data after two transmissions. Generally, two transmission stages are considered sufficient for expected force computations. This means the mechanism considers clusters made from combinations of vertex v5 and those reachable within two steps or less from v5 (v2, v6, v3, v1, v7). For FIG. 2 (ignoring edge directions and sensitivity class vertices), this gives five clusters, as given below:

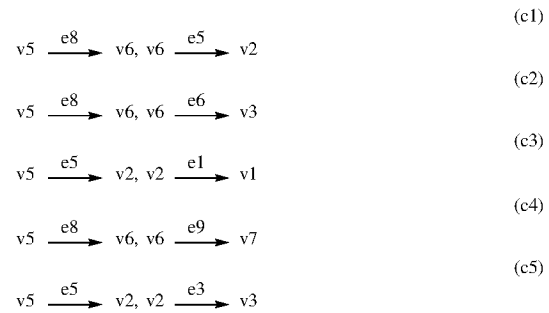

For each such cluster, the cluster degree ($d_k$) is the total number of edges incident on it. For example, cluster c1 has degree ($d_{c1}$) 3. The expected force is then approximated by the entropy of the $d_j$ after normalization. The vertex influence score of a Flow is computed by summing the expected force of all vertices in that Flow.

Subgraph

The subgraph computation process for ExF is same as that for centrality as shown in FIG. 8. The mechanisms of the illustrative embodiment simply consider the subgraph as undirected for the computation.

Groups and Inter Group Edges

Different organizations evaluate their privacy or data risks differently. For example, an organization that targets European customers and needs to be GDPR compliant will be more concerned with storing visitor data in a data center in U.S. This might not be a concern for an organization in the U.S. with only domestic customers. The illustrative embodiments address such concerns by adding an ability to easily include different vertex properties into the scoring process. This is done by considering a specific vertex property and grouping together all vertices that have the same value for that property. Then, while the mechanisms of the illustrative embodiments traverse the edges in a flow, the mechanisms check if the edge is connecting vertices that belong to two different groups. The mechanisms add up the total number of inter group edges to find the inter group edge score. An example using the geo-location property is given below.

The location property of a vertex refers to the real-life geographic location of the entity the vertex represents. This consists of a city code and a country code. For vertices labeled Application, Data store, etc., this is the geographic location of the data center or server which hosts them. The grouping operation the illustrative embodiments use effectively clubs together all entities that are in the same country (i.e., same country code). Inter-group edges in this case represent a data operation across countries. This means, higher the number of cross data center operations in a Flow, higher the inter group score.

This technique relies on different vertex properties available during ingest. Other vertex properties that can be used to divide the knowledge graph into different groups are:

1) Subnets of Internet Protocol (IP) addresses or regions in the data center, which is helpful to identify potential divisions within an application or organization.

2) Asset ownership is often tracked and maintained in organizations. Different stakeholders own different parts of an environment. Grouping by who owns an asset helps identify the number of different people with potential access.

3) The structure of the graph itself can be used to identify groups of similar vertices. This uses graph clustering algorithms (e.g., peer-pressure clustering or highly connected subgraphs) to identify vertices that belong to the same cluster or group.

These are domain-specific and require expert knowledge to configure, but the process itself is the same allowing a simple configuration that lets any property to be considered.

Frequency

The frequency property of a vertex or edge represents the number of times that vertex or edge was seen in the vertex and edge stream. For example, if an application is re-deployed, the infrastructure log parsers will identify the new deployment as a new application. This increments the frequency property of the vertex corresponding to the application by one. Similarly, if an application is repeatedly reading a column from a table, each read will increment the frequency property of the edge connecting the application to the column. When considered in context, this property reflects application or user behavior. The mechanisms of the illustrative embodiments use this as a low-cost way to distinguish between data elements that are very heavily used versus barely used. The frequency score of a Flow is computed by summing the frequency property values of all edges and vertices in that Flow.

Data Flow Ranking

Ranking Flows helps organizations to prioritize remediation, (e.g., which vulnerabilities to fix first), understand most utilized data classes, etc. To order and rank the different Flows, the mechanisms of the illustrative embodiments first identify temporal changes to Flows using Flow Intersections. This temporal information is then combined with the scores computed along each dimension to obtain an overall Flow ranking.

Temporal Flow Intersections

Data movement (or access) patterns are in a state of constant flux as users and applications interact with data. To reason about it meaningfully, the mechanisms of the illustrative embodiment need to codify these patterns in a consistent way over time. The mechanisms use temporal Flow intersections (Flow intersection or FI for short) to achieve this. A FI is a Flow along with the vertices and edges that intersect that Flow in a given time interval. FIs use a sliding window to capture data movement patterns as and when they interact with Flows.

Figure 9:
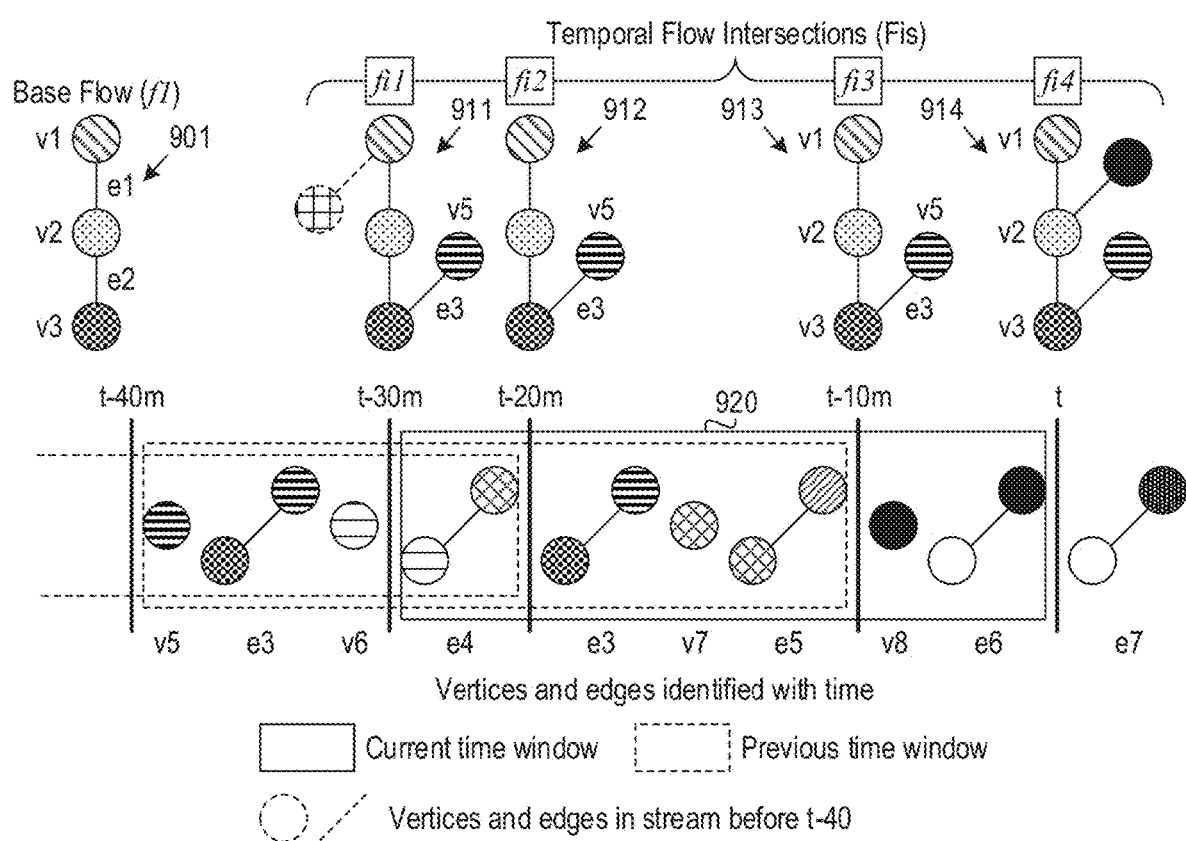
FIG. 9 illustrates temporal flow intersections in accordance with an illustrative embodiment.

Input log parsers identify vertices and edges corresponding to entities and relations and emit those as a stream. These vertices and edges are grouped into discrete time windows, with a fixed duration, and slide forward after fixed intervals. FIG. 9 illustrates temporal flow intersections in accordance with an illustrative embodiment. In the depicted example, FIG. 9 shows windows of duration 30 minutes that slide forward every 10 minutes. The exact durations of the window 920 and sliding interval heavily depend on the environment and need a domain expert with knowledge of application activity or environment usage to tune. FIs are computed per flow, per time window. To compute the FIs for a specific time window 920, edges in that time window that intersect with known Flows are identified. Lone vertices without associated edges are ignored. If an edge intersects with vertices in a known Flow, the Flow is appended with the edge (and the vertex at the other end of the edge). For instance, FIG. 9 shows one of the many Flows in the knowledge graph and how FIs of that specific Flow change with time. The same process is repeated for all known Flows in the graph. The example shows a base Flow f1 901 given at time t−40 minutes as follows:

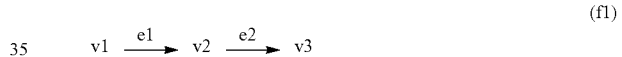

(f1)

For the FI at time t, all vertices and edges that appeared between t−30 and t are considered. In this 30 m interval, edges e4 and e5 do not intersect with any vertices in Flow f1 901 and are ignored. Edge e3 intersects with vertex v3, and edge e6 intersects with v2 to give FI fi4 914. FIs of previous time intervals (fi1 911, fi2 912, fi3 913) are also shown. Note that as new vertices and edges are processed and added to the knowledge graph from the stream, new Flows maybe added to the list of known or base Flows. These new Flows are then considered for the next set of comparisons for identifying FIs.

Figure 10:
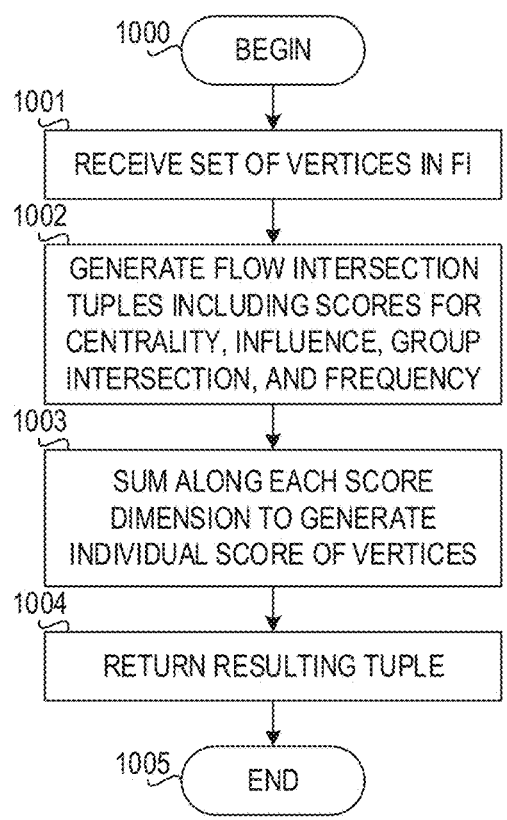
FIG. 10 is a flowchart illustrating operation of a mechanism for computing Flow intersections in accordance with an illustrative embodiment.

Each FI is associated with a tuple (FI tuple) with one entry for each of the scoring dimension described before ((centrality, influence, groupintersection, frequency)). This tuple is computed as shown in FIG. 10, by summing, along each score dimension, the individual score of vertices in a FI. A sequence of such FI tuples is then used to arrive at the overall Flow ranking as discussed next.

FIG. 10 is a flowchart illustrating operation of a mechanism for computing Flow intersections in accordance with an illustrative embodiment. Operation begins (block 1000), and the mechanism receives a set of vertices in FI (block 1001). The mechanism generates flow intersection tuples including scores for centrality, influence, group intersection, and frequency (block 1002). The mechanism then sums along each score dimension to generate individual scores of vertices (block 1003) and returns the resulting tuple (block 1004). Thereafter, operation ends (block 1005). This is also shown as Algorithm 1 below.

Algorithm 1: Computing FI observation tuple given the set of vertices in that FI:

```
Input: {V_n} ← Set of vertices in FI
Input: {D} ←
        {centrality, influence, group, frequency}
1  for d in D do
2      for i in 1 to n do
            || v_i^d gives value of property d for vertex v_i
3          O^d ← O^d + v_i^d
4  return O
```

Flow Ranking

The mechanisms of the illustrative embodiment order and rank Flows in the following manner. Observation tuples from Flow intersections form the basis of the ranking technique. Then, the mechanisms leverage techniques from distance-based statistical outlier detection to arrive at overall Flow rankings. As, described above, for each configured time interval the mechanisms generate Flow intersection tuples, which consists of scores from four different dimensions <centrality, influence, groupintersection, frequency>. If a Flow has no intersections and hence no FI tuples, the corresponding Flow level value for each dimension is used. For each Flow, the mechanisms maintain the last n FI tuples, observed for the last n time intervals. This list of tuples gives a distribution of 4-dimensional points that represent all Flows spatially and temporally. Next, the mechanisms find the square of the Mahalanobis distance between each Flow's latest tuple and the distribution. For each Flow, this distance value gives the Flow's overall, combined score. Further, ordering all Flows in decreasing order of their Mahalanobis distance value gives the rank of the Flow.

Mahalanobis distance takes into account multiple dimensions and how they are correlated to one another. Mahalanobis distance has been shown effective to detect outliers. The overall score of a Flow f that is equivalent to the square of Mahalanobis distance ($D^2$) is as follows:

$$\text{Score}_f = D^2(\vec{x}) = (\vec{x} - \vec{\mu})^T C^{-1} (\vec{x} - \vec{\mu})$$

Here, $\vec{x}$ is the feature vector of flow f, which is the last observed tuple for Flow f. $\vec{u}$ is the mean of all observations (across all Flows) in the last n intervals. $C^{-1}$ is the inverse covariance matrix of the four dimensions, computed from the stored observation tuples.

Flow Score Reporting and Thresholds

Because a Flow's score and rank change with time, it makes sense for organizations to consider a specific unit of time to report or summarize Flows. For example, taking a reporting unit of a day, the maximum score for each Flow over the course of a day can be considered as the score of that flow for that day. These can further be sorted to get a per-day rank if needed. Another operation that can be performed is to set threshold values for Flow scores, which can be used for alerting purposes. The exact threshold will need to be empirically determined and fine-tuned.

Graph Construction Challenges

A common pattern used by applications that connect to a backing data store is to present itself as a single user. This means, from the perspective of a data store, all activity originating from the application, irrespective of the application user (or end user) who initiated the activity, is attributed to a single data store user. This is shown as 102A in FIG. 1. Even if the mechanism has full visibility into all activity in the data store, it now becomes impossible to attribute that activity to a real end user without correlating the data store activity with application activity. Application design and logging can be instrumented to capture end-to-end attribution but may lead to substantial design and development overheads and an inability to support existing software. Modern, IAM (Section II) based application designs support passing end user attribution all the way down to the data store. Still, it is common for applications that use traditional relational databases as well as key value or object stores to multiplex all end user sessions into a single database user.

The goal then is to identify the probability of an edge connecting a specific application user to an individual data element. For example, in FIG. 2, from user John Doe to User ID. The mechanisms of the illustrative embodiment use the term "data session" to refer to the set of reads or writes (queries or updates) the application performs over its connection to the data store. One data session may contain references to multiple data elements like columns or documents. Below, a simple probabilistic technique is outlined that relies on timestamp of login attempts and data sessions. Here, multiple data elements in a single data session are assumed to have the same likelihood to be connected to a specific user. Given the total number of users logged into the application $N_a$ and total unique data sessions $N_d$, the mechanisms can assign a lower bound for the probability that a specific data session belongs to a specific user. This is given by $$\frac{1}{N_d}.$$

Note that $N_d \leq N_a$ always because each application user may generate more than one database session. Trivially, if there is only one user logged into the application when a session is created, the probability that those sessions belong to the logged in application user is 1 (or $N_d=1$).

Figure 11:
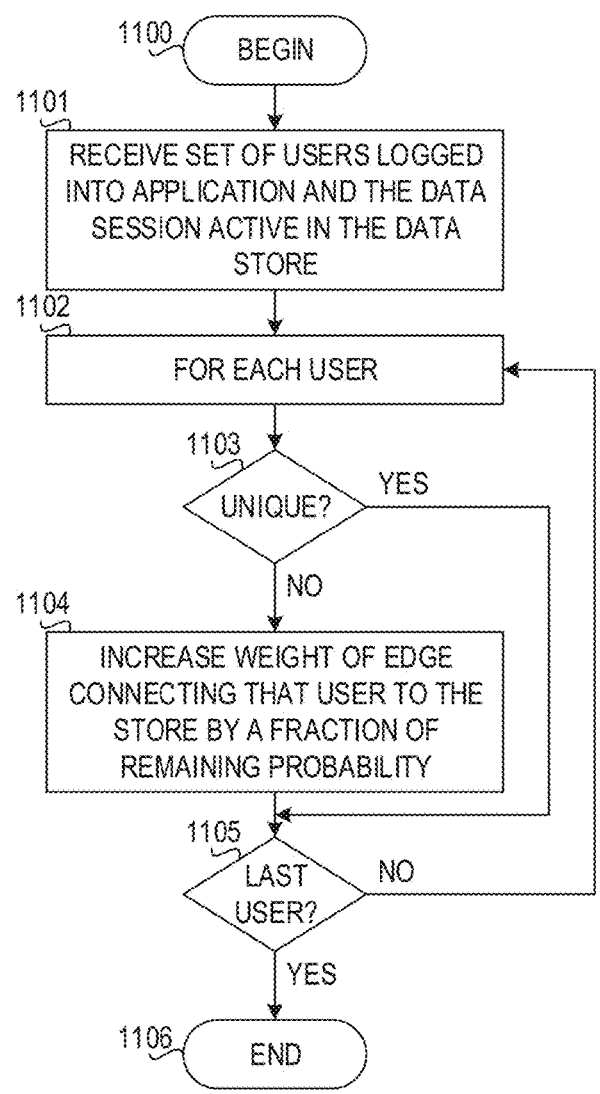
FIG. 11 is a flowchart illustrating operation of a mechanism for calculate probability of an edge between a user and a data session in accordance with an illustrative embodiment.

FIG. 11 is a flowchart illustrating operation of a mechanism for calculate probability of an edge between a user and a data session in accordance with an illustrative embodiment. Operation begins (block 1100), and the mechanism receives a set of users logged into an application and the data session active in the data store (block 1101). For each user (block 1102), the mechanism determines whether the user is unique (block 1103). The mechanism determines that a user is not unique if the user is logged in during another, later time interval with a set of other users; otherwise, the user is determined to be unique.

If the user is not unique in block 1103, then the mechanism increases the weight of the edge connecting that user to the data store by a fraction of the remaining probability (block 1104). Thereafter, or if the user is unique in block 1103, then the mechanism determines whether the user is the last user in the set (block 1105). If the user is not the last in the set, then operation returns to block 1102 to consider the next user in the set. If the determines in block 1105 that the user is the last user in the set, then operation ends (block 1106). This is also shown as Algorithm 2 below.

Algorithm 2:
Probability of edge between user $u_i$ and data session $s_j$:

```
/* U_n is set of users logged in at time t_n */
/* s_n is the data session active at time t_n */
Input: U_n = {u_1, u_2, ... }, s_n
Given: P(u_i, s_n) is the probability that user u_i is
   connected to data session s_n at time t_n
Given: P(u_i, s_0) = 0
Output: ∀u_i ∈ U, P(u_i, s_n)
1.  for i in 1 to |U_n| do
2.    if IsUnique(U_n, u_i) then
```

3.
$$P(u_i, s_n) = P(u_i, s_{n-1}) + \frac{1}{|U_n|} \times (1 - P(u_i, s_{n-1}))$$

```
4.    else
5.      P(u_i, s_n) = P(u_i, s_{n-1})
6.  Function IsUnique(U_n, u_i):
7.    for j in 1 to n do
8.      if U_n ∩ U_j! = u_i then
9.        return false
10.   return true
```

Algorithm 2 can be used to arrive at a probabilistic weight for the edge connecting a user to a data session. The algorithm takes as input, the set of users currently logged into the application (at time $t_n$) and the data session active in the data store at $t_n$. It considers time split into discrete, configured intervals. It works by assuming a discrete uniform distribution for a user's association to the data store at any specific time interval. This means all users connected to the data store (at a specific time interval), will get the same edge weight $$\left(\text{equal to } \frac{1}{\# \text{users}}\right).$$

If the same user is logged in during another, later time interval, with a set of other users, then weight of the edge connecting that user to the store is increased by a fraction of its remaining probability. For example, if 2 users $u_1$ and $u_2$ are logged in at time $t_1$, each user will get an edge to the data store with connection probability weight 0.5. Now at time $t_2$, if the two users logged in are $u_2$ and $u_3$, probability of $u_1$ will remain the same, $u_2$ will go up to 0.75

$$\left(\text{which is, } 0.5 + \frac{1 - 0.5}{2}\right),$$

and probability of $u_3$ will be 0.5.

Uniquely Identifying Vertices

Another interesting challenge is when multiple input parsers identify the same entity. For example, infrastructure log parsers (107 in FIG. 1) may identify a new application being deployed. At the same time, the app query parser (106 in FIG. 1) may identify the same application and add a new application vertex into the stream. These two need to be coalesced into one. Currently, the mechanisms of the illustrative embodiments use a simple unique ID generation technique that strings together IP address, port, application name etc., in the same way. This ensures both application vertices to have the same unique ID, and hence the ability to coalesce them into a single vertex.

Implementation

The implementation described here is for purposes of illustration only and are not intended to limit the claimed invention. The implementation is only and example embodiment, and alternative implementations will be apparent to a person of ordinary skill in the art. In one example embodiment, the Flow-based ranking scheme is implemented as a set of microservices in Python® programming language. PYTHON is a registered trademark of the Python Software Foundation in the United States, other countries, or both. All microservices are deployed in a Kubernetes (K8) cluster. Kubernetes is an open-source system for automating deployment, scaling, and management of containerized applications. The K8 cluster uses centralized logging, which gathers all infrastructure and application logs into an Elasticsearch™ instance. ELASTICSEARCH is a trademark of Elasticsearch BV, registered in the U.S. and in other countries. The application infrastructure log parsers poll this Elasticsearch instance with a 30 s interval for new logs. Audit logging is enabled for this K8 cluster, which provides detail of new applications (pods) being deployed.

Application queries are captured by a containerized proxy server that mediates connection to the database. The proxy server logs all application queries, which are polled and consumed. Vertices and edges identified by the log parsers are added to a time series database, before being inserted into the knowledge graph. Log parsers also perform local summaries before adding a vertex or edge to the stream. This means, if the same vertex appears multiple times in the current run, a single vertex with frequency property equal to the number of appearances is placed in the stream.

The knowledge graph is an instance of JanusGraph, on top of Apache Cassandra™ persistent store. JanusGraph is a scalable graph database optimized for storing and querying graphs containing hundreds of billions of vertices and edges distributed across a multi-machine cluster. APACHE CASSANDRA is a trademark of The Apache Software Foundation in the United States, other countries, or both. Gremlin language variants are used to interact with the knowledge graph from individual microservices. For some of the analytics (e.g., ExF, Ranking) Gremlin queries load a subgraph into memory, and the sensitive data risk identification engine operates on the in-memory data using Python™ packages like Networkx, NumPy, Pandas etc.

Visualizations

The illustrative embodiments surface privacy-related data flows in a way that can support threat modelling and risk mitigation processes adopted by security officers and analysts. Scoring Flows serves as a prioritization mechanism for these processes. Also, mapping organizational assets (users, applications, devices) and business process owners to Flow elements makes the result of our analysis actionable. The sensitive data risk identification engine of the illustrative embodiments builds a graphical user interface (GUI) that helps to convey these priorities in a fast and effective way. In one example embodiment, this GUI is a React/Next NodeJS application, which leverages carbon-components to render a dashboard.

This GUI shows the geographical location of different components of a Flow, overall Flow scores and rank along each dimension. To provide an at-a-glance view of where privacy related sensitive data resides and how that data is flowing, sensitive data elements are grouped by geography and presented on a world map. Selecting a specific area on the active map displays risks to privacy related data classes for the selected geography.

It is understood in advance that although this disclosure includes a detailed description on cloud computing, implementation of the teachings recited herein are not limited to a cloud computing environment. Rather, the illustrative embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 12:
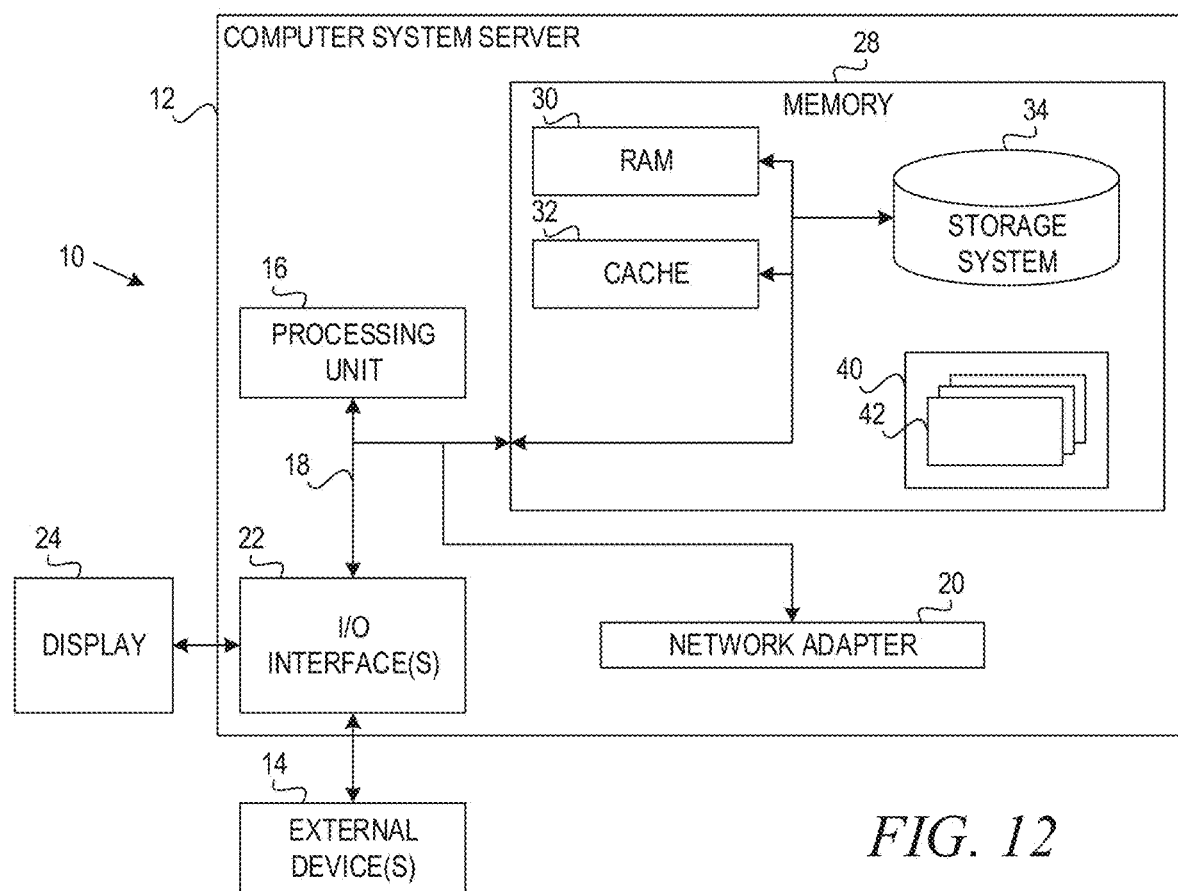
FIG. 12 depicts a schematic of an example of a cloud computing node in accordance with an illustrative embodiment.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
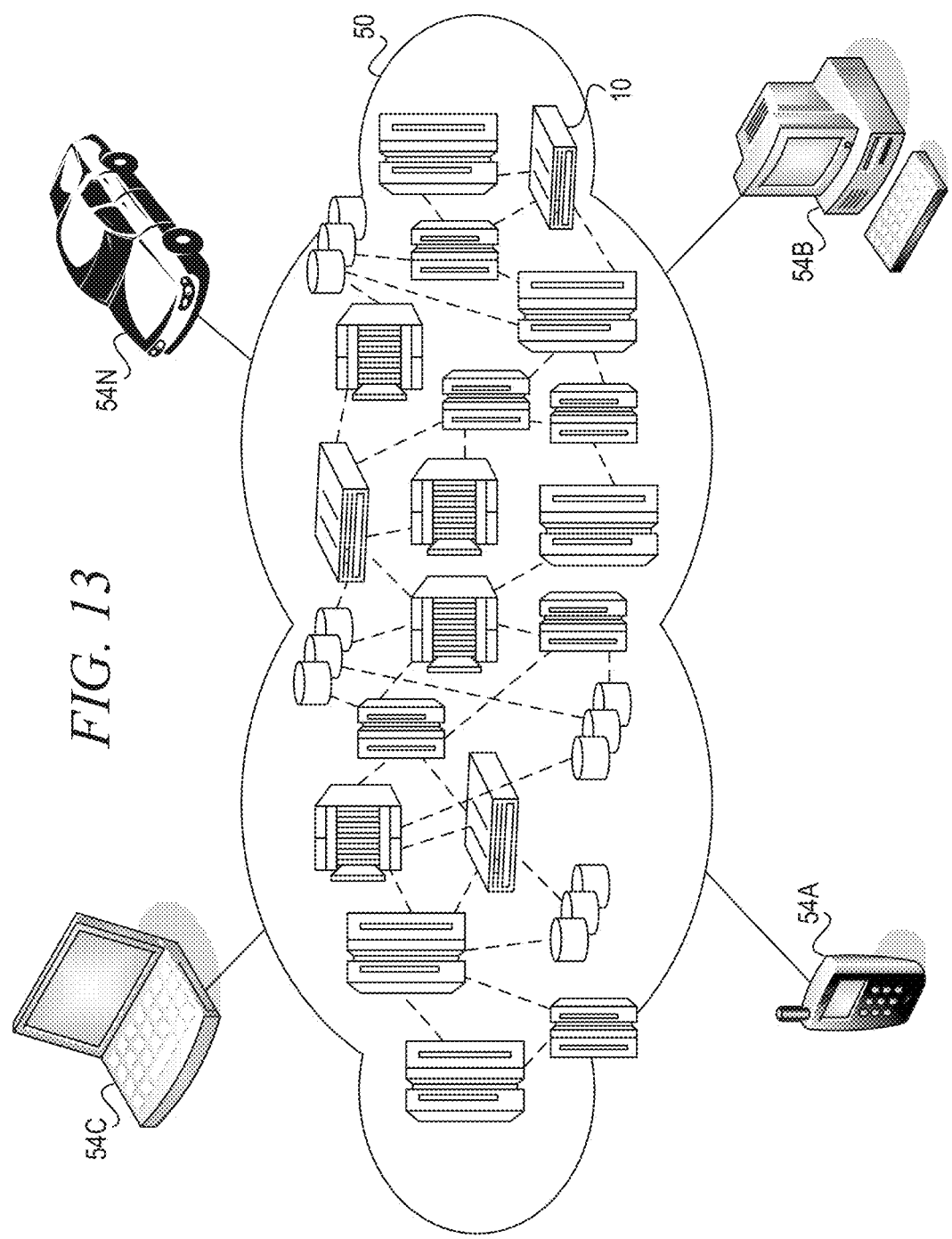
FIG. 13 depicts an illustrative cloud computing environment in accordance with an illustrative embodiment.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
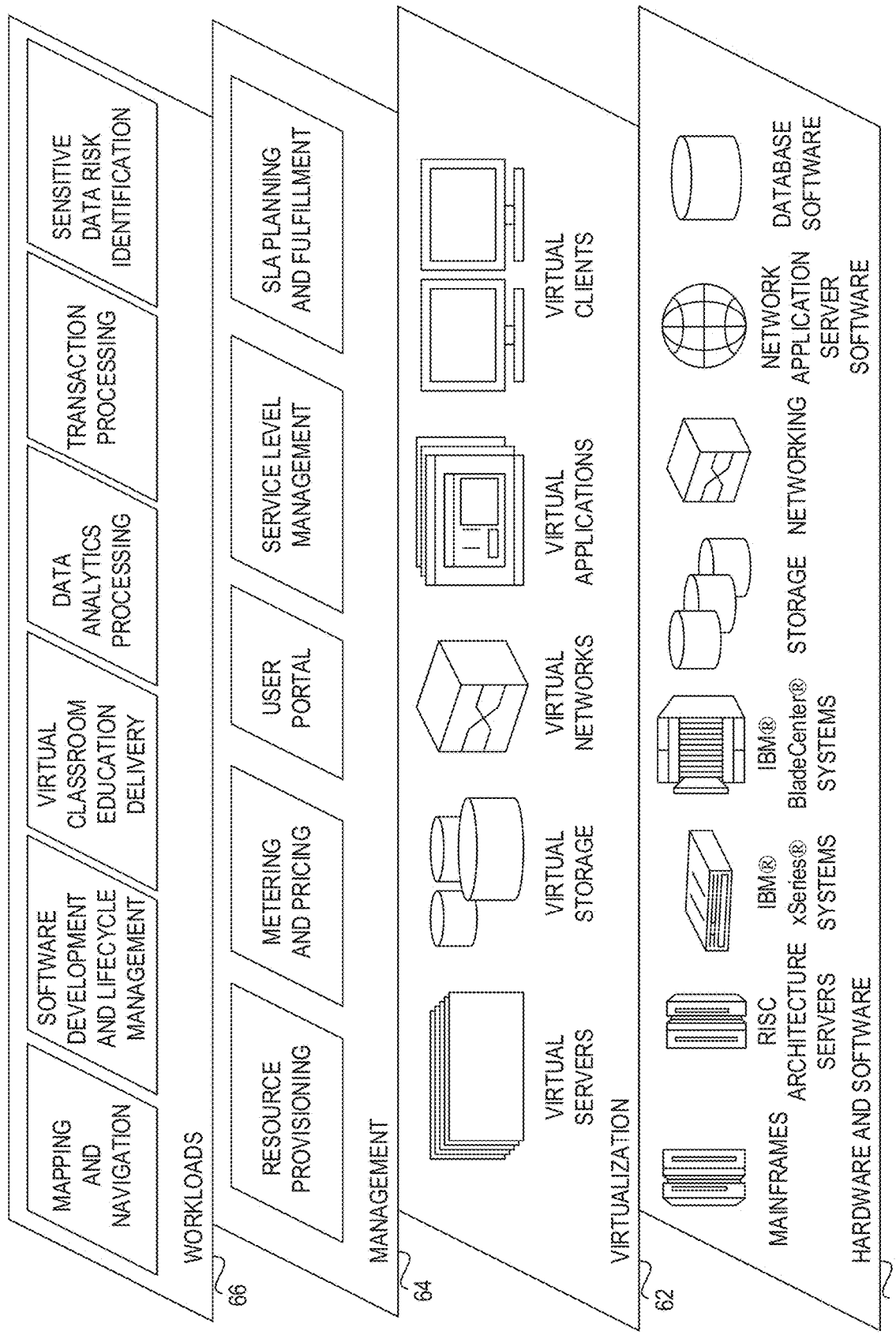
FIG. 14 depicts a set of functional abstraction layers provided by cloud computing environment in accordance with an illustrative embodiment.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and sensitive data risk identification.

In accordance with the illustrative embodiments, the sensitive data risk identification engine enables data researchers, data officers, and analysts to easily understand and express what is happening with their sensitive data and to manage their privacy hazards. More specifically, sensitive data risk identification engine codifies ground truths about sensitive data movement and data into one simple abstraction, codify temporal changes to data movement that would allow monitoring and alerting, help data officers to identify and prioritize sensitive data classes (e.g., PII, trade secrets) that are most relevant for them, help data officers identify applications or users that are at a higher risk in case of an attack or exposure, allow prioritizing remedial action and provide enough context and detail to do the actual remediation, provide the ability to customize the techniques to suit individual scenarios or business use cases, and help security analysts perform impact analysis, threat, and risk modeling.

The sensitive data risk identification engine captures data flows at the granularity of data elements that can be identified by state-of-the-art data classifiers. The sensitive data risk identification engine captures the relations between users, applications, data elements they interact with (columns or documents), their geographic locations, etc. The relations are captured as a knowledge graph, where vertices are data elements, their data classes, and entities that operate on data elements. Edges in this knowledge graph represent different ways in which these entities are connected, like data reads, user logins etc. From this knowledge graph, the sensitive data risk identification engine of the illustrative embodiments identifies Flows, which are data paths that start at data elements and end at applications, users, etc. Flows allow the sensitive data risk identification engine to perform detailed risk and impact analysis of sensitive data. Flows can also determine policy compliance or impact of policy changes and breaches. The sensitive data risk identification engine can then move along all Flows in that data class to see impacted applications and systems. This allows organizations to track their top data movements and changes to it over time.

The illustrative embodiments may be embodied in or implemented as a system, a method, and/or a computer program product. The computer program product may include a computer readable storage medium (or media) having computer readable program instructions thereon for causing a processor to carry out aspects of the illustrative embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the illustrative embodiments.

Aspects of the illustrative embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the sensitive data risk identification engine of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the illustrative embodiments has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for identifying sensitive data risks in cloud-based deployments, the method comprising:
   building a knowledge graph based on data schema information for a cloud-based computing environment, a set of parsed infrastructure logs, and a set of captured application queries;
   identifying a set of sensitive flows in the knowledge graph representing paths from a sensitive data element to an endpoint in the knowledge graph;
   scoring the set of sensitive flows based on a scoring algorithm, wherein the scoring algorithm determines scores for the set of sensitive flows along a plurality of dimensions comprising a centrality dimension and at least one of an influence dimension, group intersection dimension, or a frequency dimension; and
   issuing an alert to an administrator in response to a score of a sensitive flow within the set of sensitive flows exceeding a threshold, wherein the scoring algorithm determines scores for the set of sensitive flows along the centrality dimension and the frequency dimension, and wherein, for each vertex in the set of sensitive flows, the score along the frequency dimension is determined at least by accumulating a number of times an entity associated with the vertex reads sensitive data.

2. The method of claim 1, wherein building the knowledge graph comprises creating vertices representing one or more data stores in the cloud-based computing environment and data elements contained in the one or more data stores.

3. The method of claim 2, wherein building the knowledge graph further comprises creating vertices representing data classes of the data elements.

4. The method of claim 3, wherein building the knowledge graph further comprises creating vertices representing one or more applications based on the set of captured application queries and edges representing ways in which the one or more applications operate on the data elements.

5. The method of claim 1, wherein identifying the set of sensitive flows in the knowledge graph comprises:
defining a set of vertex labels that are considered endpoints in the knowledge graph;
selecting a set of vertices in the knowledge graph matching the set of vertex labels to form a selected set of vertices;
collecting outgoing edge and vertex until reaching a vertex having an outgoing edge to a sensitive data class for each vertex in the selected set of vertices; and
returning the collected edges and vertices as sensitive flows in the knowledge graph.

6. The method of claim 1, wherein determining a score for centrality comprises computing a Personalized PageRank score.

7. The method of claim 1, wherein determining a score for influence comprises computing an expected force (ExF) metric.

8. The method of claim 1, further comprising executing a security remediation based on the alert.

9. A computer program product comprising a computer readable storage medium having a computer readable program stored therein, wherein the computer readable program, when executed on a computing device, causes the computing device to:
build a knowledge graph based on data schema information for a cloud-based computing environment, a set of parsed infrastructure logs, and a set of captured application queries;
identify a set of sensitive flows in the knowledge graph representing paths from a sensitive data element to an endpoint in the knowledge graph;
score the set of sensitive flows based on a scoring algorithm, wherein the scoring algorithm determines scores for the set of sensitive flows along a plurality of dimensions comprising a centrality dimension and at least one of an influence dimension, group intersection dimension, or a frequency dimension; and
issue an alert to an administrator in response to a score of a sensitive flow within the set of sensitive flows exceeding a threshold, wherein the scoring algorithm determines scores for the set of sensitive flows along the centrality dimension and the frequency dimension, and wherein, for each vertex in the set of sensitive flows, the score along the frequency dimension is determined at least by accumulating a number of times an entity associated with the vertex reads sensitive data.

10. The computer program product of claim 9, wherein building the knowledge graph comprises creating vertices representing one or more data stores in the cloud-based computing environment and data elements contained in the one or more data stores.

11. The computer program product of claim 10, wherein building the knowledge graph further comprises creating vertices representing data classes of the data elements.

12. The computer program product of claim 11, wherein building the knowledge graph further comprises creating vertices representing one or more applications based on the set of captured application queries and edges representing ways in which the one or more applications operate on the data elements.

13. The computer program product of claim 9, wherein identifying the set of sensitive flows in the knowledge graph comprises:
defining a set of vertex labels that are considered endpoints in the knowledge graph;
selecting a set of vertices in the knowledge graph matching the set of vertex labels to form a selected set of vertices;
collecting outgoing edge and vertex until reaching a vertex having an outgoing edge to a sensitive data class for each vertex in the selected set of vertices; and
returning the collected edges and vertices as sensitive flows in the knowledge graph.

14. An apparatus comprising:
a processor; and
a memory coupled to the processor, wherein the memory comprises instructions which, when executed by the processor, cause the processor to:
build a knowledge graph based on data schema information for a cloud-based computing environment, a set of parsed infrastructure logs, and a set of captured application queries;
identify a set of sensitive flows in the knowledge graph representing paths from a sensitive data element to an endpoint in the knowledge graph;
score the set of sensitive flows based on a scoring algorithm, wherein the scoring algorithm determines scores for the set of sensitive flows along a plurality of dimensions comprising a centrality dimension and at least one of an influence dimension, group intersection dimension, or a frequency dimension; and
issue an alert to an administrator in response to a score of a sensitive flow within the set of sensitive flows exceeding a threshold, wherein the scoring algorithm determines scores for the set of sensitive flows along the centrality dimension and the frequency dimension, and wherein, for each vertex in the set of sensitive flows, the score along the frequency dimension is determined at least by accumulating a number of times an entity associated with the vertex reads sensitive data.

15. A method, in a data processing system, for identifying sensitive data risks in cloud-based deployments, the method comprising:
parsing infrastructure logs for a cloud-based computing environment to identify one or more applications deployed in the cloud-based environment and one or more users authenticating to the one or more applications;
capturing queries the one or more applications to one or more data stores in the cloud-based computing environment;
building a knowledge graph based on data schema information for the cloud-based computing environment, the parsed infrastructure logs, and the captured queries;
identifying a set of sensitive flows in the knowledge graph representing paths from a sensitive data element to an endpoint in the knowledge graph;

ranking the set of sensitive flows to form a ranked set of sensitive flows based on a scoring algorithm, wherein the scoring algorithm determines scores for the set of sensitive flows along a plurality of dimensions comprising a centrality dimension and a frequency dimension wherein, for each vertex in the set of sensitive flows, the score along the frequency dimension is determined at least by accumulating a number of times an entity associated with the vertex reads sensitive data; and outputting the ranked set of sensitive flows.

16. The method of claim 15, wherein ranking the set of sensitive flows comprises identifying one or more temporal flow intersections representing a given sensitive flow along with vertices and edges that intersect the given sensitive flow in a given time interval.

17. The method of claim 15, wherein ranking the set of sensitive flows comprises ordering the set of sensitive flows in decreasing order of Mahalanobis distance value.

18. The method of claim 15, wherein outputting the ranked set of sensitive flows comprises generating a graphical user interface (GUI) presenting geographical locations components of the set of sensitive flows.

19. The method of claim 1, wherein the scoring algorithm determines, for each sensitive flow, a score along the centrality dimension at least by:

generating, for each vertex in the set of sensitive flows, a ranking score based on a propagation of a rank value from one vertex to another connected vertex in the set of sensitive flows; and for vertices that do not have outgoing edges, performing a teleportation operation that teleports propagation of the rank value to a randomly selected vertex using a damping factor to model a probability that data read from one data element is not propagated further, wherein the teleportation operation is limited to vertices in the set of sensitive flows, and wherein vertices with a higher concentration of sensitive data have a higher relative ranking score.

20. The method of claim 1, wherein the scoring algorithm determines scores for the set of sensitive flows along the centrality dimension and the influence dimension, and wherein the score along the influence dimension is determined at least by:

for each vertex in the set of sensitive flows, identifying one or more clusters of vertices to which the vertex can spread data within a predetermined number of transmission stages;

for each cluster in the one or more clusters, determining a degree of the cluster based on a number of edges incident on the cluster; and for each cluster in the one or more clusters, approximating an expected force measure based on an entropy of the degree of the cluster.

21. The method of claim 1, wherein the scoring algorithm determines scores for the set of sensitive flows along the centrality dimension and the group intersection dimension, and wherein the score along the group intersection dimension is determined at least by:

selecting a vertex property and grouping together all vertices that have a same value of the selected vertex property;

identifying one or more inter-group edges, wherein an inter-group edge is an edge in the set of sensitive flows that connects from a vertex in a first group of vertices to a second vertex belonging to a different group of vertices; and for each vertex in the set of sensitive flows, adding up a total number of inter-group edges associated with the vertex to determine an inter-group edge score for the vertex.

22. The method of claim 21, wherein the vertex property is one of a geo-location property specifying a geographical location of a vertex, a subnet of Internet Protocol addresses, or an asset ownership property.

23. The method of claim 1, further comprising evaluating temporal flow intersections at least by defining a moving window of vertices and edges, and evaluating flow intersections with known flows in the moving window of vertices and edges for a plurality of time points, wherein the moving window is determined for each time point in the plurality of time points, and wherein scoring the set of sensitive flows comprises summing the scores for vertices in flow intersections.

* * * * *